(12) United States Patent
Sarkar et al.

(10) Patent No.: US 11,552,976 B2
(45) Date of Patent: Jan. 10, 2023

(54) SYSTEMS AND METHODS FOR SOCIAL NETWORK ANALYSIS ON DARK WEB FORUMS TO PREDICT ENTERPRISE CYBER INCIDENTS

(71) Applicant: Arizona Board of Regents on Behalf of Arizona State University, Tempe, AZ (US)

(72) Inventors: Soumajyoti Sarkar, Tempe, AZ (US); Mohammed Almukaynizi, Chandler, AZ (US); Jana Shakarian, Chandler, AZ (US); Paulo Shakarian, Chanlder, AZ (US)

(73) Assignees: Arizona Board of Regents on behalf of Arizona State University, Tempe, AZ (US); Cyber Reconnaissance, Inc., Tempe, AZ (US)

( * ) Notice: Subject to any disclaimer, the term of this patent is extended or adjusted under 35 U.S.C. 154(b) by 493 days.

(21) Appl. No.: 16/653,899

(22) Filed: Oct. 15, 2019

(65) Prior Publication Data

US 2022/0070196 A1    Mar. 3, 2022

Related U.S. Application Data

(60) Provisional application No. 62/745,731, filed on Oct. 15, 2018.

(51) Int. Cl.
*H04L 9/40*     (2022.01)
*G06N 20/00*    (2019.01)
*G06N 5/02*     (2006.01)

(52) U.S. Cl.
CPC .......... *H04L 63/1433* (2013.01); *G06N 5/02* (2013.01); *G06N 20/00* (2019.01); *H04L 63/1416* (2013.01); *H04L 63/1425* (2013.01)

(58) Field of Classification Search
CPC ............ H04L 63/1433; H04L 63/1416; H04L 63/1425; G06N 20/00; G06N 5/02
See application file for complete search history.

(56) References Cited

U.S. PATENT DOCUMENTS

| 10,176,438 | B2 | 1/2019 | Shakarian et al. |
| 10,313,385 | B2 | 6/2019 | Shakarian et al. |
| 10,437,945 | B2 | 10/2019 | Shakarian et al. |
| 2018/0225372 | A1* | 8/2018 | Lecue ............... G06N 7/005 |
| 2019/0095530 | A1* | 3/2019 | Booker ............. G06F 16/313 |
| 2019/0132352 | A1* | 5/2019 | Zhang ............. H04L 63/1483 |
| 2019/0266283 | A1* | 8/2019 | Shukla ............. G06N 20/00 |

(Continued)

FOREIGN PATENT DOCUMENTS

GB     2583892 A  * 11/2020  ......... H04L 27/3881

OTHER PUBLICATIONS

Veeramachaneni, et al., AI2W: training a big data machine to defend, 2016 IEEE 2nd International Con-ference on Big Data Security on Cloud (BigDataSecurity), IEEE International Conference on High Performance and Smart Computing (HPSC), and IEEE International Conference on Intelligent Data and Security (IDS), pp. 49-54. IEEE, 2016.

(Continued)

*Primary Examiner* — Sarah Su
(74) *Attorney, Agent, or Firm* — Polsinelli PC

(57) ABSTRACT

Systems and methods for predicting enterprise cyber incidents using social network analysis on the darkweb hacker forums are disclosed.

10 Claims, 37 Drawing Sheets

(56) References Cited

U.S. PATENT DOCUMENTS

| | | |
|---|---|---|
| 2019/0347327 A1 | 11/2019 | Patil et al. |
| 2019/0349393 A1 | 11/2019 | Nunes et al. |
| 2020/0036743 A1 | 1/2020 | Almukaynizi et al. |
| 2020/0169483 A1* | 5/2020 | Kursun .................. H04L 63/08 |
| 2020/0356675 A1 | 11/2020 | Shakarian et al. |
| 2020/0364349 A1 | 11/2020 | Nunes et al. |
| 2020/0410028 A1 | 12/2020 | Shaabani et al. |
| 2021/0019762 A1* | 1/2021 | Bosnjakovic .......... G06N 5/022 |
| 2021/0158176 A1* | 5/2021 | Wan .................... G06F 16/3334 |
| 2021/0367966 A1* | 11/2021 | Yanay ................... H04L 63/102 |
| 2021/0382944 A1* | 12/2021 | Li ........................ G06F 16/906 |

OTHER PUBLICATIONS

Xu, et al., Longitudinal lasso: Jointly learning features and temporal contingency for outcome prediction, Proceedings of the 21th ACM SIGKDD International Conference on Knowledge Discovery and Data Mining. ACM, 2015.

Xu, et al., The topology of dark networks, Communications of the ACM 51.10: 58-65, 2008.

Yang, et al., A comparative analysis of community detection algorithms on artificial networks, Scientific reports 6: 30750, 2016.

Yip, et al., Why forums?: an empirical analysis into the facilitating factors of carding forums, Proceedings of the 5th Annual ACM Web Science Conference. ACM, 2013.

Zhang, Daoqiang, et al., Temporally-constrained group sparse learning for longitudinal data analysis, International Conference on Medical Image Computing and Computer-Assisted Intervention. Springer, Berlin, Heidelberg, 2012.

U.S. Appl. No. 16/548,329, filed Aug. 22, 2019, Tavabi et al.

Akoglu, et al., Graph based anomaly detection and description: a survey. Data mining and knowledge discovery, 29(3), pp. 626-688.

Allodi, Economic factors of vulnerability trade and exploitation, Proceedings of the 2017 ACM SIGSAC Conference on Computer and Communications Security. ACM, 2017.

Allodi, et al., Then and now: On the maturity of the cybercrime markets the lesson that black-hat marketeers learned, IEEE Transactions on Emerging Topics in Computing 4.1 (2016): 35-46.

Almukaynizi, et al., Predicting cyber threats through the dynamics of user connectivity in darkweb and deepweb forums, ACM Computational Social Science. ACM, 2017.

Almukaynizi, et al., Proactive identification of exploits in the wild through vulnerability mentions online, Cyber Conflict (CyCon US), 2017 International Conference on. IEEE, 2017.

Al-Rowaily, et al., BiSALA bilingual sentiment analysis lexicon to analyze Dark Web forums for cyber security, Digital Investigation 14: 53-62, 2015.

Bilge, et al., Before we knew it: an empirical study of zero-day attacks in the real world, Proceedings of the 2012 ACM conference on Computer and communications security. ACM. 2012.

Bilge, et al., RiskTeller: Predicting the Risk of Cyber Incidents, Proceedings of the 2017 ACM SIGSAC Conference on Computer and Communications Security. ACM, 2017.

Chandola, et al., Anomaly detection: A survey, ACM computing surveys (CSUR) 41.3: 15, 2009.

Chen, Sentiment and affect analysis of dark web forums: Measuring radicalization on the internet, Intelligence and Security Infomatics, ISI 2008, IEEE International Conference, 2008.

Chierichetti, et al., Rumour spreading and graph conductance, Proceedings of the twenty-first annual ACM-SIAM symposium on Discrete Algorithms, Society for Industrial and Applied Mathematics, 2010.

Colbaugh, et al., Proactive defense for evolving cyber threats, Intelligence and Security Informatics (ISI), 2011 IEEE International Conference on. IEEE, 2011.

Danezis, et al., Sybillnfer: Detecting Sybil Nodes using Social Networks, NDSS, pp. 1-15, 2009.

Edkrantz, et al., Predicting vulnerability exploits in the wild, Cyber Security and Cloud Computing (CSCloud), 2015 IEEE 2nd International Conference on. IEEE, 2015.

Ferrara, et al., The rise of social bots, Communications of the ACM, 59(7), pp. 96-104. 2016.

Goyal, et al., Discovering Signals from Web Sources to Predict Cyber Attacks, arXiv preprint arXiv:1806.03342, 2018.

Grier, et al., Manufacturing compromise: the emergence of exploit-as-a-service, Proceedings of the 2012 ACM conference on Computer and communications security, pp. 821-832. ACM, 2012.

Haslebacher, et al., All your cards are belong to us: Understanding online carding forums, Electronic Crime Research (eCrime), 2017 APWG Symposium on. IEEE, 2017.

Herley, et al., Nobody sells gold for the price of silver: Dishonesty, uncertainty and the underground economy, Economics of information security and privacy. Springer, Boston, MA, 2010. 33-53.

Hodge, et al., A survey of outlier detection methodologies, Artificial intelligence review 22.2: 85-126, 2004.

Huang, et al., In-network PCA and anomaly detection, Advances in Neural Information Processing Systems, pp. 617-624. 2007.

Khandpur, et al., Crowdsourcing cybersecurity: Cyberattack detection using social media, Proceedings of the 2017 ACM on Conference on Information and Knowledge Management. ACM, 2017.

Kotenko, et al., Analyzing vulnerabilities and measuring security level at design and exploitation stages of computer network life cycle, International Workshop on Mathematical Methods, Models, and Architectures for Computer Network Security. Springer, Berlin, Heidelberg, 2005.

Lakhina, et al., Diagnosing network-wide traffic anomalies, ACM SIGCOMM Computer Communication Review, vol. 34, No. 4, pp. 219-230. ACM, 2004.

L'huillier, et al., Topic-based social network analysis for virtual communities of interests in the dark web, ACM SIGKDD Explorations Newsletter 12, No. 2: 66-73, 2011.

Liu, et al., Cloudy with a Chance of Breach: Forecasting Cyber Security Incidents, USENIX Security Symposium, pp. 1009-1024, Aug. 2015.

Liu, et al., Predicting cyber security incidents using feature-based characterization of network-level malicious activities, Proceedings of the 2015 ACM International Workshop on International Workshop on Security and Privacy Analytics. ACM, 2015.

Meier, The group lasso for logistic regression, Journal of the Royal Statistical Society: Series B (Statistical Methodology) 70.1: 53-71, 2008.

Nagaraja, et al., Anonymity in the wild: Mixes on unstructured networks, International Workshop on Privacy Enhancing Technologies, pp. 254-271. Springer, Berlin, Heidelberg, 2007.

Nagaraja, et al., BotGrep: Finding P2P Bots with Structured Graph Analysis, USENIX Security Symposium, vol. 10, pp. 95-110, 2010.

Nunes, et al., Darknet and deepnet mining for proactive cybersecurity threat intelligence, arXiv preprint arXiv:1607.08583, 2016.

Okutan, et al., Forecasting cyber at-tacks with imbalanced data sets and different time granularities, arXiv preprint arXiv:1803.09560, 2018.

Phillips, et al., Extracting social structure from darkweb forums. 97-102, 2015.

Randall, Rapidly mixing Markov chains with applications in computer science and physics, Computing in Science and Engineering 8.2: 30-41, 2006.

Reksna, Complex Network Analysis of Darknet Black Market Forum Structure. MS thesis. 2017.

Ribeiro, et al., Why should I trust you?: Explaining the predictions of any classifier, Proceedings of the 22nd ACM SIGKDD international conference on knowledge discovery and data mining (pp. 1135-1144). ACM, Aug. 2016.

Sabottke, et al., Vulnerability Disclosure in the Age of Social Media: Exploiting Twitter for Predicting Real-World Exploits, USENIX Security Symposium. 2015.

Samtani, et al., Exploring hacker assets in under-ground forums, Intelligence and Security Informatics (ISI), 2015 IEEE International Conference on. IEEE, 2015.

Sapienza, et al., DISCOVER: Mining Online Chatter for Emerging Cyber Threats, Companion of the The Web Conference 2018 on The

(56) References Cited

OTHER PUBLICATIONS

Web Conference 2018, pp. 983-990. International World Wide Web Conferences Steering Committee, 2018.
Sarkar, et al., Predicting enterprise cyber incidents using social network analysis on the darkweb hacker forums, arXiv preprint arXiv:1811.06537, 2018.
Shakarian, et al., Exploring malicious hacker forums, Cyber Deception. Springer, Cham, 2016. 259-282.
Shlens, A tutorial on principal component analysis, arXiv preprint arXiv:1404.1100 2014.
Sood, et al., Cybercrime: Dissecting the state of underground enterprise, IEEE internet computing 17.1 (2013): 60-68.
Tang, et al., Temporal distance metrics for social network analysis, Proceedings of the 2nd ACM workshop on Online social networks, pp. 31-36. ACM, 2009.
Thonnard, et al. Are you at risk? Profiling organizations and individuals subject to targeted attacks, International Conference on Financial Cryptography and Data Security. Springer, Berlin, Heidelberg, 2015.
Tibshirani, et al., An ordered lasso and sparse time-lagged regression, Technometrics 58, No. 4 (2016): 415-423.

\* cited by examiner (a) Malicious-email (b) Malicious-email (c) Endpoint-malware (d) Endpoint-malware (b)

(b) Malicious-email (c) Endpoint-malware (d) Endpoint-malware (e) Malicious-destination (f) Malicious-destination (a)

(c)

(a) malicious-email (b) Malicious-email (c) Endpoint-malware (d) Endpoint-malware

Time Series - Features from Darkweb Discussions (External to Company E)

To Predict Daily Attacks for E

δ

SYSTEMS AND METHODS FOR SOCIAL NETWORK ANALYSIS ON DARK WEB FORUMS TO PREDICT ENTERPRISE CYBER INCIDENTS

CROSS REFERENCE TO RELATED APPLICATIONS

This is a non-provisional application that claims benefit to U.S. provisional patent application Ser. No. 62/745,731 filed on Oct. 15, 2018, which is herein incorporated by reference in its entirety.

GOVERNMENT SUPPORT

This invention was made with government support under FA9550-15-1-0159 awarded by the Air Force Office of Scientific Research and under W911NF-15-1-0282 awarded by the Army Research Office and under N00014-16-1-2015 awarded by the Office of Naval Research. The government has certain rights in the invention.

FIELD

The present disclosure generally relates to predicting enterprise cyber incidents, and in particular to systems and methods for predicting enterprise cyber incidents using social network analysis on darkweb hacker forums.

BACKGROUND

With the recent data breaches such as those of Yahoo, Uber, Equifax among several others that emphasize the increasing financial and social impact of cyberattacks, there has been an enormous requirement for technologies that could provide such organizations with prior alerts on such data breach possibilities. On the vulnerability front, the Risk Based Security's VulnDB database published a total of 4,837 vulnerabilities in a quarter of 2017, which was around 30% higher than previous year. This motivates the need for extensive systems that can utilize vulnerability associated information from external sources to raise alerts on such cyberattacks. The darkweb is one such place on the internet where users can share information on software vulnerabilities and ways to exploit them. Surprisingly, it might be difficult to track the actual intention of those users, thus making it necessary to use data mining and learning to identify the discussions among the noise that could potentially raise alerts on attacks on external enterprises. In this paper, the information obtained from analyzing the reply network structure of discussions in the darkweb forums is leveraged to understand the extent to which the darkweb information can be useful for predicting real world cyberattacks.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1A:
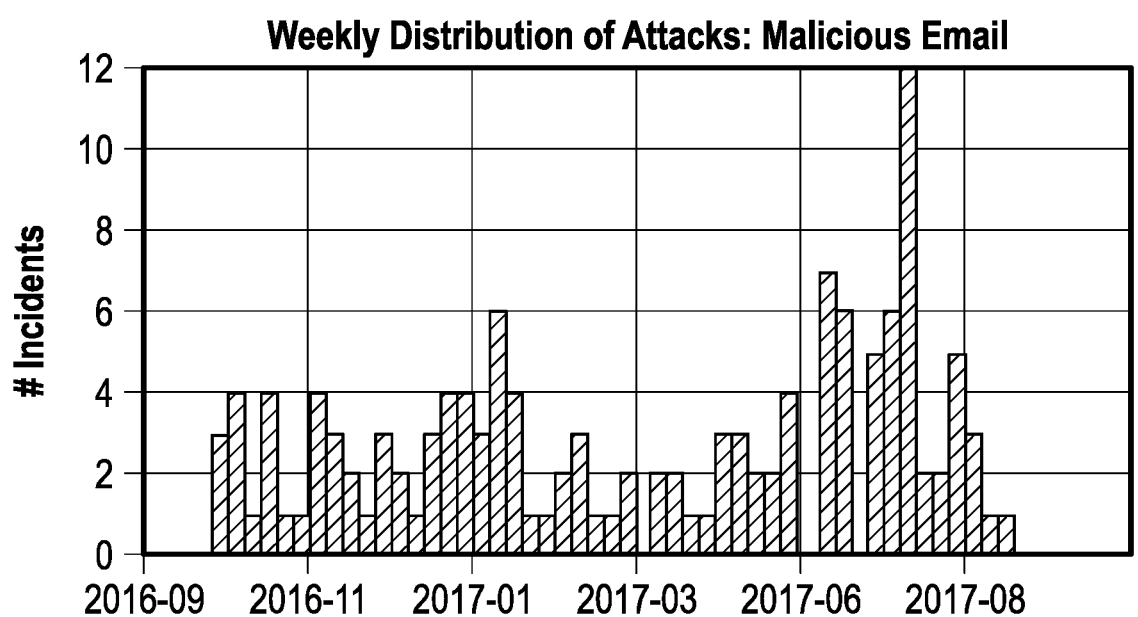
FIGS. 1A, 1B, and 1C are graphical representations showing a weekly occurrence of security breach incidents of different types.

Most of the work related to vulnerability discussions on trading exploits in the underground forums and related social media platforms like Twitter have focused on two aspects: (1) analyzing vulnerabilities discussed or traded in the forums and the markets, thereby giving rise to the belief that the "lifecycle of vulnerabilities" in these forums and marketplaces and their exploitation have significant impact on real world cyber attacks prioritizing or scoring vulnerabilities using these social media platforms or binary file appearance logs of machines to predict the risk state of machines or systems. These two components have been used in silos and the present disclosure ignores the steps between vulnerability exploit analysis and the final task of real world cyber attack prediction by removing the preconceived notions used in earlier studies where vulnerability exploitation is considered a precursor towards attack prediction. The present disclosure instead hypothesizes on user interaction dynamics conceived through posts surrounding these vulnerabilities in these underground platforms to generate warnings for future attacks. The present disclosure does not consider whether vulnerabilities have been exploited or not in these discussions since a lot of zero-day attacks might occur before such vulnerabilities are even indexed and their gravity might lie hidden in discussions related to other associated vulnerabilities or some discussion on exploits. The premise on which this research is setup is based on the dynamics of all kinds of discussions in the darkweb forums, but present process filters out the noise to mine important patterns by studying whether a piece of information gains traction within important communities.

The present disclosure discusses:

Creating a network mining technique using the directed reply network of users who participate in the darkweb forums, to extract a set of specialized users termed experts whose posts with popular vulnerability mentions gain attention from other users in a specific time frame.

Following this, generating several time series of features that capture the dynamics of interactions centered around these experts across individual forums as well as general social network and forum posting statistics based feature time series.

Using these time series features to train a supervised learning model based on logistic regression with attack labels from an organization to predict daily attacks. The best results were obtained with an F1 score of 0.53 on a feature that explores the path structure between experts and other users compared to the random (without prior probabilities) F1 score of 0.37. Additionally, superior performance of features was found from discussions that involve vulnerability information over network centralities and forum posting statistics.

A widely used unsupervised anomaly detection technique that uses residual analysis to detect anomalies is applied and an anomaly based attack prediction technique on a daily basis is proposed. Additionally, a supervised learning model is trained based on logistic regression with attack labels from an organization to predict daily attacks.

Empirical evidence from the unsupervised anomaly detector suggests that a feature based on graph conductance that measures the random walk transition probability between groups of users is a useful indicator for attack occurrences given that it achieved the best AUC score of 0.69 for one type of attack. Similar best results are obtained for the supervised model having the best F1 score of 0.53 for the same feature and attack type compared to the random (without prior probabilities) F1 score of 0.37. Additionally, the performance of the models in weeks where frequency of attacks is higher is investigated and the superior performance of community structures in networks in predicting these attacks is found.

The rest of the disclosure introduces several terms and a dataset related to the vulnerabilities and the darkweb, a general framework for attack prediction including feature curation and learning models, and test results.

BACKGROUND AND DATASET

In this section, the dataset will be described used to analyze the interaction patterns of the users in the Darkweb and the real world security incidents data which is used as ground truth for the evaluation of the prediction models described herein.

Enterprise-Relevant External Threats (GT)

Ground Truth (GT) was used to provide data from Armstrong Corporation which included information on cyber attacks on their systems in the period of April 2016 to September 2017. The data contains the following relevant attributes: {event-type: The type of attack called event—type and event occurred date: Date on which there was an attack of particular event-type. The event-types that are used in this study are: Malicious email refers to an event associated with an individual in the organization receiving an email that contains either a malicious attachment of link, and Endpoint Malware refers to a malware on endpoint that is discovered on an endpoint device. This includes, but not limited to, ransomware, spyware, and adware.

Figure 1B:
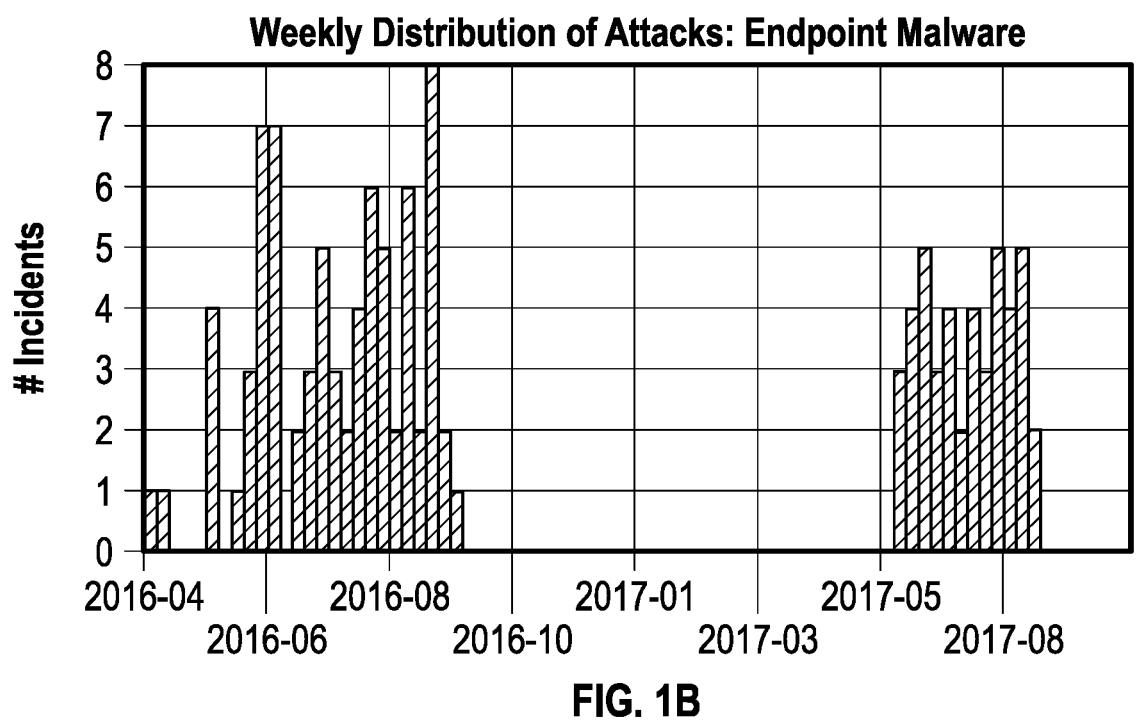

As shown in FIGS. 1A and 1B, the distribution of attacks over time is different for the events. The total number of incidents reported for the events are as follows: 119 tagged as endpoint-malware and 135 for malicious-email events resulting in a total of 280 incidents over a span of 17 months that were considered in this disclosure.

Darkweb Data

The dark web forms a small part of the deep web, the part of the Web not indexed by web search engines, although sometimes the term deep web is mistakenly used to refer specifically to the dark web. All the darkweb data used was obtained through an API provided by a commercial platform.

A darkweb forum structure exhibits a hierarchical structure wherein each forum consists of several independent threads in which a thread caters to a particular discussion on a topic, and wherein each thread spans several posts initiated by multiple users over time. One user can appear multiple times in the sequence of posts depending on when and how many times the user posted in that thread. Forums were filtered out based on a threshold number of posts that were created in the timeframe of January 2016 to September 2017. Data was gathered from 179 forums in that time period where the total number of unique posts irrespective of the thread that they belonged to, were 5,57 689. The number of forums with less than 100 posts was large and therefore the present system only considered forums which had greater than 5,000 posts in that time period which gave a total of 53 forums. The set of these 53 forums used in this dataset used the symbol F.

Common Vulnerabilities and Exposures (CVE): The database of Common Vulnerabilities and Exposures maintained on a platform operated by the MITRE corporation provides an identity mapping for publicly known information-security vulnerabilities and exposures. All the information was collected regarding the vulnerability mentions in the darkweb forums in the period from January 2016 to October 2017. The total number of CVEs mentioned in the posts across all forums during this period was 3553.

CVE-CPE mapping: A CPE (Common Platform Enumeration) is a structured naming scheme for identifying and grouping clusters of information technology systems, software and packages maintained in a platform NVD (National Vulnerability Database) operated by NIST. Each CVE can be assigned to different CPE groups based on the naming system of CPE families. Similarly, each CPE family can have several CVEs that conform to its vendors and products that the specific CPE caters to. In order to cluster the set of CVEs in this disclosure into a set of CPE groups, the present system used the set of CPE tags for each CVE from the NVD database maintained by NIST. For the CPE tags, the present system only considered the operating system platform and the application environment tags for each unique CPE. Examples of CPE would include: Microsoft Windows_95, Canonical ubuntu_linux, Hp elitebook_725_g3. The first component in each of these CPEs denoted the operating system platform and the second component denoted the application environment and their versions.

Forum topic: Each darkweb forum or site f consists of several threads h initiated by a specific user and over time, several users' post and reply in these threads. It is noted that one user can appear multiple times in the sequence of posts depending on when and how many times the user posted in that thread. Since each thread is associated with a topic (or a title), the terms topic are often used to refer to a particular thread h comprising all posts in the relevant forum. The set of these 53 forums used in this dataset are denoted using the symbol F.

Framework for Attack Prediction

In order to build an integrated framework leveraging the network formed from the discussions in the forums as signals for predicting organization specific attacks, the framework is segregated into the three steps of any classic machine learning framework: (1) given a time point t on which the present system needs to predict an enterprise attack of a particular event type (2) features from the darkweb forums prior to t were used and, (3) These features were used as input to a learned model to predict attack on t. One of the main tasks involved learning the attack prediction model, one for each event type. Steps (2) and (3) below relate to feature curation and building supervised learning models These steps are introduced in further detail as follows:

Feature engineering: The reply network formed from the thread replies in forums is leveraged to build features for input to the model. To this end two kinds of features are built:

Graph Based Features: Features pertaining to the dynamics of replies from users with credible knowledge to regular posts are identified—the intuition behind this is to see whether a post gaining attention from active and reputed users can be a predictive signal.

Forum metadata: Some forum metadata is also gathered as another set of features and used as baselines for the graph based features. As a first step towards achieving this, an algorithm is devised to create the reply network structure from the replies in the threads in this step prior to feature computation.

Figure 6:
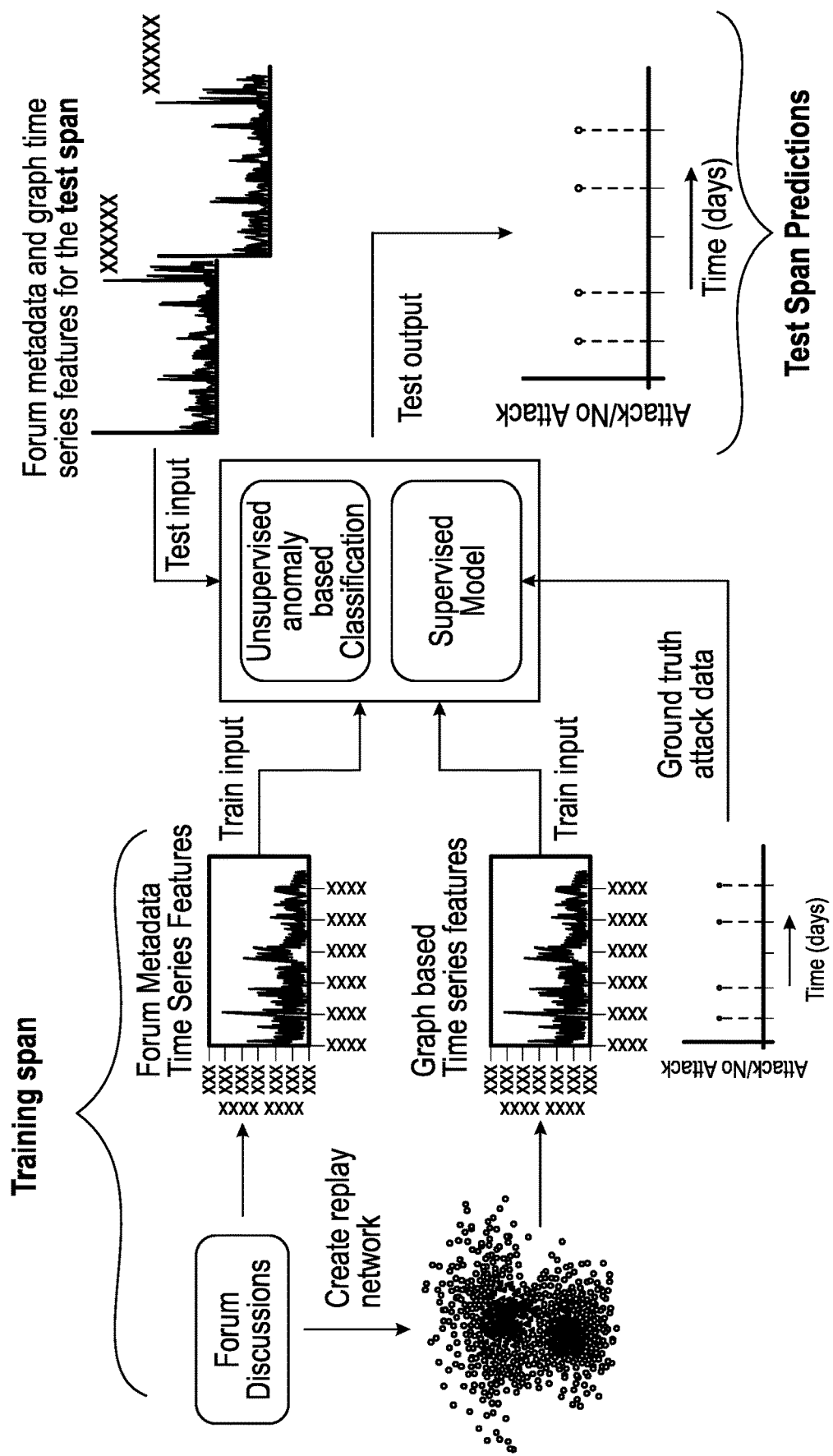
FIG. 6 is an overview of a framework used for attack prediction.

Training (learning) models for prediction: In this step, the timeframe of the attack study is first split into two segments: one corresponding to the training span and the other being the test span. However, unlike normal cross-validated machine learning models, it may be necessary to be careful about the time split, since longitudinal networks are considered for features and the training-test split should respect the forecasting aspect of the prediction—features 6 days prior to the day the attacks are predicted for are used. So instead of using cross-validation, the training time span is fixed as the first few time points in the ground truth dataset (chronologically ordered) and the test span succeeding the training span. Several time-series of individual features are built using only forum discussions in the training span and used as input along with the attack ground truth to a supervised model for learning the parameters (separate models are built for separate attack types and different attack organizations). This along with Step 1 is shown in FIG. 6 on the left side under the training span stage.

Attack prediction: In this final step, the time series of the same set of features in the test span is first computed, and the forum discussions in the test span (6 days prior to the prediction time point) are now used. These time series are inputted into the supervised model as well as an additional unsupervised model (that does not require any training using ground truth), to output attacks on a daily basis in the test span. This step is displayed in the right component of FIG. 6.

In the following sections, the steps are explained in detail that also describes the intuition behind the approach used for attack prediction in this disclosure.

Step 1: Feature Engineering

The mechanism in which temporal networks are built and the features used for the prediction problem will be described. The preset system built three groups of features across forums: (1) Expert centric; (2) User/Forum statistics; and (3) Network centralities.

In general, the primary goal in this step is to devise a method to compute social network features on a streaming basis while appropriately setting the time span of the training period for which the features are computed to train the models as well as for unsupervised models as well. The method entails two stages for feature computation:

STAGE 1: Creating networks on a streaming basis—features are computed on a daily basis and to that end, the daily networks comprise two components:
 a) The nodes (users) and edges (interactions) that are part of the current day for which the features are being computed
 b) The nodes and edges of a historical network constructed from an aggregated interactions over the month prior to month in which the current day is in.
 c) So, by design, the historical network is constant for all days in a particular month while the daily networks are created for each day.
 d) The merge step is an operation to fuse the historical network and the daily network so as to create the networks on a daily basis.

Such streaming nature of the feature computation design allows us to update the features on a daily basis, since some of the features are based off on "experts"—users who have actively participated in credible conversations in that period. And since, these set of users keep changing frequently, this method allows for this dynamic nature of forum participations.

STAGE 2: Feature computation on a daily basis using the evolving networks

Using these evolving networks as described in Stage 1, the following network based features are computed on a daily basis:
 a) Graph conductance
 b) Shortest path
 c) Expert replies
 d) Common communities To achieve this goal, a technique may be relied on of first extracting a set of users termed "expert" users from the historical network, and all the above 4 features are based on interactions between these expert users and users who participated in forums on a particular day.

Darkweb Reply Network: The absence of global user IDs across forums is assumed, and therefore the social interactions using networks induced on specific forums are analyzed instead of considering the global network across all forums. In one aspect, the directed reply graph of a forum f∈F by $G^f=(V^f, E^f)$ is denoted where $V^f$ denotes the set of users who posted or replied in some thread in forum f at some time in the considered time frame of data and $E^f$ denotes the set of 3-tuple $u_1, u_2$, rt directed edges where $u_1, u_2 \in V^f$ and rt denote the time at which $u_1$ replied to a post of $u_2$ in some thread in f, $u_1 \rightarrow u_2$ denoting the edge direction. $G_\tau^f=(V_\tau^f, E_\tau^f)$ is used to denote a temporal subgraph of $G^f$, $\tau$ being a time window such that $V_\tau^f$ denotes the set of individuals who posted in f in that window and $E_\tau^f$ denotes the set of tuples $(v_1, v_2, rt)$ such that $(v_1, v_2, rt)$. Two operations are used to create temporal networks: Create—that takes a set of forum posts in f within a time window T as input and creates a temporal subgraph $G_\tau^f$, and Merge—that takes two temporal graphs as input and merges them to form an auxiliary graph. To keep the notations simple, the present system would drop the symbol f when describing the operations for a specific forum in F as context but which would apply for any forum f∈F. A detailed algorithm relating the network construction is given in Algorithm 1. An incremental analysis approach was adopted by splitting the entire set of time points in the frame of study into a sequence of time windows $\Gamma=\{\tau_1, \tau_2, \ldots, \tau_Q\}$, where each subsequence $\tau_i$, $i \in [1, Q]$ is equal in time span and non-overlapping and the subsequences are ordered by their stalling time points for their respective span.

CREATE: Creating the reply graph—Let h be a particular thread or topic within a forum f containing posts by users $V_h^f=\{u_1, \ldots, u_k\}$ posted at corresponding times $T_h^f = \{t_1, \ldots, t_k\}$, where k denotes the number of posts in that thread and $t_i \geq t_j$ for any $i > j$, that is the posts are chronologically ordered. To create the set of edges $E_h^f$ 2 users ($u_i$, $u_j) \in V_h^f$ are connected such that $i > j$, that is user $u_i$ has potentially replied to $u_j$, and subject to a set of spatial and temporal constraints. These constraints make up for the absence of exact information about the reply hierarchies as to whom u replied to in a particular post in h.

Specifically, since a reply network on the forum posts is considered, the lack of information as to who replied to whom necessitates the use of some heuristics to connect the users based on temporal and spatial information. It is noted that in situations where the data comes with the hierarchical reply structure of who-replies-to-whom, this step can be avoided and can be skipped to the next stage. A simple approach would be to consider either (i) a temporal constraint: for each user $u_i$ of a post in a thread h in forum f at time $t_i$, an edge ($u_i$, $u_k$, t) would be created such that $t_i - t_k < \text{thresh}_{temp}$, $u_k$ denotes the user for the respective posts at time $t_k \in \tau$, $\text{thresh}_{spat}$ denoting a time threshold or (ii) a spatial constraint: consider all edges ($u_i$, $u_k$, t) where $u_k$ denotes the user of the $k^{th}$ post in the time ordered sequence of posts and $k-i \leq \text{thresh}$, thresh denoting a count threshold. The idea behind reply edge construction based on the combination of these two constraints is the following: in a time interval where there are a lot of discussions, networks with the edges created from the condition bounded by $\text{thresh}_{temp}$ would be unduly over-dense. Thus the second condition bounds the number of posts (prior to its current post) that a user can reach to while replying using its current post. In a way, this ensures normalization since the hypothesis here is that a user can only reach/reply to a certain number of posts prior to the current time irrespective of how popular the discussions might be in a specific time intervals.

Both the constraints are used in the following way: for the $i^{th}$ post $p_{h,i}$ in the thread h posted at time $t_i$, the objective is to create links from the user of this post to the posts prior to this as reply links. For this, a maximum of $\text{thresh}_{spat}$ count of posts prior to $p_{h,i}$ (note the posts in the thread are considered chronologically ordered) is considered, that is all posts $p_{h,k}$ such that $k-i \leq \text{thresh}_{spat}$. The users for those respective posts would be the potential users to whom $U_{h,i}$ replied to (unidirectional links), which is denoted by $\{u_{h,i \to k}\}$ and the corresponding set of posts $\{p_{h,i \to k}\}$. The next layer of constraints considering temporal boundaries prune out candidates from $\{u_{h,k}\}$, using the following two operations:

If $t_i - t_k < \text{thresh}_{temp}$, edges are formed linking $u_{h,i}$ to all users in $\{u_{h,i \to k}\}$ (note the direction of reply). This takes care of the first few posts in h where there might not be enough time to create a sensation, but anyhow the users might be replying as a general discussion in the thread. So it is considered that user of $i^{th}$ post replies potentially to all these users of $\{u_{h,i \to k}\}$ at one go whether it is at the beginning or whether it is in the middle of an ongoing thread discussion.

If $t_i - t_k \geq \text{thresh}_{temp}$, the mean of the time differences between two successive posts in $\{p_{h,i \to k}\}$ is first computed. The time difference between $t_i$ and the time of the last post in $\{p_{h,i \to k}\}$ is denoted considering the chronological ordering is maintained (this is the post prior to i), as $\Delta t_i$. If the computed mean is less than $\Delta t_i$, edges are formed linking $u_{h,i}$ to all users in $\{u_{h,i \to k}\}$ (this is similar to the first constraint). Else, as long as the mean is greater than $\Delta t_i$, the posts in $\{p_{h,i \to k}\}$ are removed farthest in time to $t_i$ in order and the mean is recalculated after removal of such posts. This procedure is repeated until at some iteration either the recomputed mean is less than $\Delta t_i$ or $t_i - t_k < \text{thresh}_{temp}$. This heuristic considers the case for posts that receive a lot of replies very frequently at certain time of the thread lifecycle, although it is not reasonable to consider posts which have been posted a while ago as being replied to by the current post in consideration.

Following this, $V^f = \cup_h V_h^f$ and $E^f = \cup_h E_h^f$ that is multiple interactions between the same set of users in multiple threads are removed without weighting these edges. As before, a temporal subgraph of $G^f$ would be denoted by $G_\tau^f$ where (u, v, rt) $\in E_\tau$ denotes u replied to v at time rt $\in \tau$. The objective after creating the reply network $G_\tau^f$ is to compute features from this network that could then be used as input to a machine learning model for predicting cyber attacks. These features would act as the unconventional signals for predicting external enterprise specific attacks. In order to achieve that, a feature x (among a set of network features) denoted by $\mathcal{T}_{x,f}$ is formed for every forum $f \in F$ separately: formally $\mathcal{T}_{x,f}$ is a stochastic process that maps each time point t to a real number.

Figure 2:
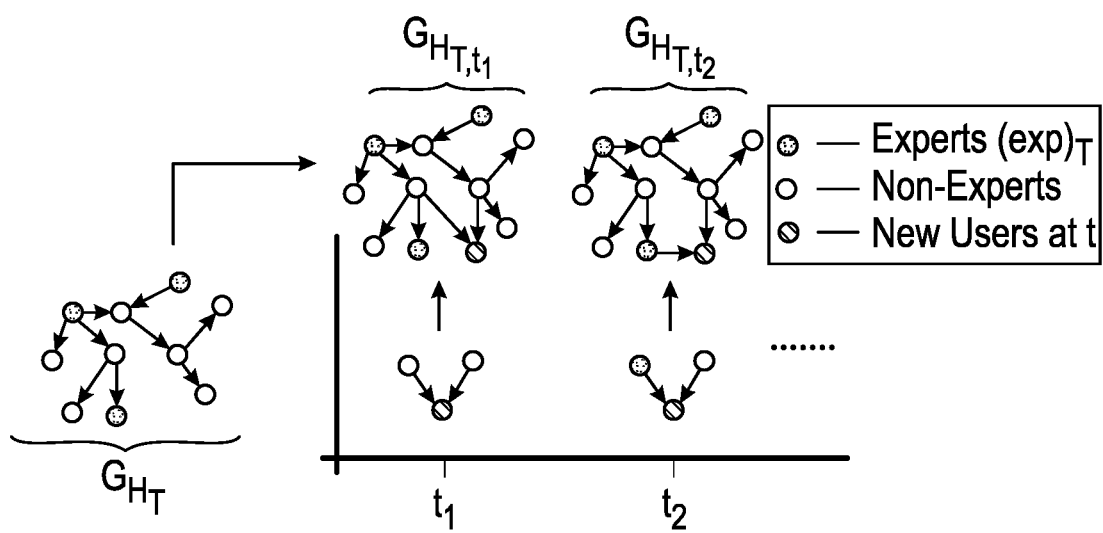
FIG. 2 is an illustration showing a Merge operation.

MERGE: Merging network—In order to create a time series feature $\mathcal{T}_{x,f}$ for feature x from threads in forum f that maps each time point $t \in \tau$, $\tau \in \Gamma$ to a real number, two networks were used: (1) the historical network $G_{H_\tau}$ which spans over time $H_\tau$ such that $\forall t' \in H_\tau$, and $t \in \tau$, $t' < t$, and (2) the network $G_t^f$ induced by user interactions between users in $E_t$, which varies temporally for each $t \in \tau$. It was noted that the historical network $G_{H_\tau}$ would be different for each subsequence $\tau$ and same for all $t \in \tau$, so as the subsequences $T \in \Gamma$ progress with time, the historical network $G_{H_\tau}$ also changes, and the choice of spans $T \in \Gamma$ and $H_\tau$ is discussed herein. Finally, for computing feature values for each time point $t \in \tau$, the present system merges the two networks $G_{H_\tau}$ and $G_t$ to form the auxiliary network $G_{H_\tau,t} = (V_{H_\tau,t}, E_{H_\tau,t})$, where $V_{H_\tau,t} = V_{H_\tau} \cup V_t$ and $E_{H_\tau,t} = E_{H_\tau} \cup E_t$. A visual illustration of this method is shown in FIG. 2. Several features the present system used that would be fed to a learning model for attack prediction will be described. The present system considers several network features and computes time series of several features x, $\mathcal{T}_{x,f}[t]$ for every time point t in the frame of study and for every forum f separately.

TABLE 1

List of features used for learning. Each feature $\tau_x$ is computed separately across forums.

| Group | Features | Description |
|---|---|---|
| Expert centric | Graph Conductance | $\tau_x[t] = \dfrac{\sum_{k \in exp_\tau} \sum_{y \in V_t \setminus exp_\tau} \pi(exp_\tau) P_{xy}}{\pi(exp_\tau)}$ | where $\pi(\cdot)$ us the stationary distribution of the network $H_{H_\tau,t}$, $P_{xy}$ denotes the probability of random walk from vertices x to y. The TABLE 1-continued List of features used for learning. Each feature $\tau_x$ is computed separately across forums.

| Group | Features | Description |
|---|---|---|
| | | conductance represents the probability of taking a random walk from any of the experts to one of the users in $V_t \backslash \exp_\tau$, normalize by the probability weight of being on an expert. |
| | Shortest Path | $\tau_x[t] = \frac{1}{|\exp_\tau|} \sum_{e \in \exp_T} \min_{u \in V_t \backslash \exp_T} s_{e,u}$ where $s_{e,u}$ denotes the shortest path from an expert e to user u following the direction of edges. |
| | Expert replies | $\tau_x[t] = \frac{1}{|\exp_\tau|} \sum_{e \in \exp_T} |OutNeighbors(e)|$ where OutNeighbors(·) denotes the out neighbors of user in the network $G_{H_\tau,t}$. |
| | Common Communities | $\tau_x[t] = \{N(c(u)|c(u) \in c_{experts} \land u \in V_t \backslash \exp_\tau\}$ where c(u) denotes the community index of user u, $c_{experts}$ that of the experts and N (·) denotes a counting function. It counts the number of users who share communities with experts. |
| Forum/ User Statistics | Number of threads | $\tau_x[t] = |\{h|thread\ h\ was\ posted\ on\ t\}|$ |
| | Number of users | $\tau_x[t] = |\{h|thread\ u\ posted\ on\ t\}|$ |
| | Number of expert threads | $\tau_x[t] = |\{h|thread\ h\ was\ posted\ on\ t\ by\ users\ u \in experts\}|$ |
| | Number of CVE mentions | $\tau_x[t] = |\{CVE|CVE\ was\ mentioned\ in\ some\ post\ on\ t\}|$ |
| Network Centralities | Outdegree$_k$ | $\tau_x[t]$ = Average value of k users, by outdegree on t |
| | CVE | $\tau_x[t]$ = Average value of top k users with more than 1 CVE mention in their posts, by outdegree on t |
| | Pagerank$_k$ | $\tau_x[t]$ = Average value of top k users, by Pagerank on t |
| | Pagerank$_k$ CVE | $\tau_x[t]$ = Average value of top k users with more than 1 CVE mention in their posts, by pegerank on t |
| | Betweenness$_k$ | $\tau_x[t]$ = Average value of top k users, by Betweenness on t |
| | Betweenness$_k$ CVE | $\tau_x[t]$ = Average value of top k users with more than 1 CVE mention in their posts, by betweenness on t |

Expert Centric Features

A set of users were extracted termed experts who have a history of CVE mentions in their posts and whose posts have gained attention in terms of replies. Following that, the present system mines several features that explain how attention is broadcast by these experts to other posts. All these features were computed using the auxiliary networks $G_{H_\tau,t}$ for each time t. The hypothesis is based on the premise that any unusual activity must spur attention from users who have knowledge about vulnerabilities.

The present system focuses on users whose posts in a forum contain most discussed CVEs belonging to important CPEs over the timeframe of analysis, where the importance will shortly be formalized. For each forum f, the historical network $G_{H_\tau}^f$ is used to extract the set of experts relevant to timeframe $\tau$, that is $\exp_\tau^f \in V_{H_\tau}^f$. First, the top CPE groups $CP_\tau^{top}$ are extracted in the time frame $H_\tau$ based on the number of historical mentions of CVEs. The CPE groups are sorted based on the sum of the CVE mentions in $\tau$ that belong to the respective CPE groups and take the top 5 CPE groups by sum in each $H_\tau$. Using these notations, the experts $\exp_\tau^f$ from history $H_\tau$ considered for time span $\tau$ are defined as users in f with the following three constraints: (1) Users who have mentioned a CVE in their post in $H_\tau$. This ensures that the user engages in the forums with content that is relevant to vulnerabilities. (2) let $\theta(u)$ denote the set of CPE tags of the CVEs mentioned by user u in his/her posts in $H_\tau$ and such that it follows the constraint: either $\theta(u) \in CP_\tau^{top}$ where the user's CVEs are grouped in less than 5 CPEs or, $CP_\tau^{top} \in \theta(u)$ in cases where a user has posts with CVEs in the span $H_\tau$, grouped in more than 5 CPEs. This constraint filters out users who discuss vulnerabilities which are not among the top CPE groups in $H_\tau$ and (3) the in-degree of the user u in $G_{H_\tau}$ should cross a threshold. This constraint ensures that there are a significant number of users who potentially responded to this user thus establishing u's central position in the reply network. Essentially, these set of experts $\exp_\tau$ from $H_\tau$ would be used for all the time points in $\tau$. Path and community based features are created based on these experts listed in Table I.

Network Based Features

The network $G_{H_\tau}^f$ is leveraged to compute features on a regular basis—the advantage is that this network contains historical information but at the same time, this historical information does not update on a regular basis. For extracting network based features, the interactions convened by users in forums with a knack towards posting credible information are focused on. The objective is to investigate whether any spike in attention towards posts on a day from such users with some credible reputation translates to predictive signals for cyber-attacks on an organization. This would also in a way help filter out noisy discussions or replies from unwanted or naive users who post information irrelevant to vulnerabilities or without any malicious intent. It can be hypothesized that predictive signals would exhibit users in these daily reply networks whose posts have received attention (in the form of direct or indirect replies) from some "expert" users—whether a faster reply would translate to an important signal for an attack is one of the novel questions tackled here.

In order to be able to extract posts that receive attention on a daily basis, "expert" users who attention the present disclosure seeks to gather are extracted.

Expert Users. For each forum f, the historical network $G_{H_\tau}^f$ is used to extract the set of experts relevant to timeframe r, that is $\exp_\tau^f \in V_{H_\tau}^f$. First, the top CPE groups $CP_\tau^{top}$ are extracted in the time frame $H_\tau$ based on the number of historical mentions of CVEs. These would be used as top CPEs for the span τ. For this, the CPE groups are sorted based on the sum of the CVE mentions that belong to the respective CPE groups and take the top 5 CPE groups by sum in each $H_\tau$. Using these notations, the experts $\exp_\tau^f$ from history $H_\tau$ considered for time span τ are defined as users in f with the following three constraints:

Users who have mentioned a CVE in their post in $H_\tau$. This ensures that the user engages in the forums with content that is relevant to vulnerabilities.

Let θ(u) denote the set of CPE tags of the CVEs mentioned by user u in his/her posts in $H_\tau$ and such that it follows the constraint: either $θ(ú) \in CP_\tau^{top}$ where the user's CVEs are grouped in less than 5 CPEs or, $CP_\tau^{top} \in θ(u)$ in cases where a user has posts with CVEs in the span $H_\tau$, grouped in more than 5 CPEs. This constraint filters out users who discuss vulnerabilities which are not among the top CPE groups in $H_\tau$.

The in-degree of the user u in $G_{H_\tau}$ should cross a threshold. This constraint ensures that there are a significant number of users who potentially responded to this user thus establishing u's central position in the reply network. These techniques to filter out relevant candidates based on network topology has been widely used in the bot detection communities Other centrality metrics are avoided instead of using the in-degree in the third constraint since the focus here is not to judge the position of the user from the centrality perspective (for example, high betweenness would not denote the user receives multiple replies on its posts). Instead, it is more desirable to filter out users who receive multiple replies on their posts or in other words their posts receive attention. Essentially, these set of experts $\exp_\tau$ from $H_\tau$ would be used for all the time points in τ as shown in FIG. 6 The objective here is to not consider the degree as the proxy for user importance in any terms. Rather the degree indicates the number of replies it gets from other users.

Why focus on experts? To show the significance of these properties in comparison to other users, the following hypothesis test was performed: the time periods of 3 widely known security events were collected—the Wannacry ransomware attack that happened on May 12, 2017 and the vulnerability MS-17-010, the Petya cyber attack on 27 Jun. 2017 with the associated vulnerabilities CVE-2017-0144, CVE-2017-0145 and MS-17-010, the Equifax breach attack primarily on Mar. 9, 2017 with vulnerability CVE-2017-5638. Two sets of users across all forums—$\exp_\tau$, where $G_{H_\tau}$ were considered denotes the corresponding historical network prior to τ in which these three events occurred and the second set of users being all $U_{alt}$ who are not experts and who fail either one of the two constraints: they have mentioned CVEs in their posts which do not belong to $CP^{top}$ or their in-degree in $G_{H_\tau}$ lies below the threshold. $G_{H_\tau}$ was considered being induced by users in the last 3 weeks prior to the occurrence week of each event for both the cases, and the total number of interactions considered ignoring the direction of reply of these users with other users. Let $\deg_{exp}$ denote the vector of count of interactions in which the experts were involved and $\deg_{alt}$ denote the vector of counts of interactions in which the users in $U_{alt}$ were involved. A number of users were randomly picked from $U_{alt}$ equal to the number of experts and sort the vectors by count. A two sample t-test is conducted on the vectors $\deg_{exp}$ and $\deg_{alt}$ was conducted. The null hypothesis $H_o$ and the alternate hypothesis $H_1$ are defined as follows; $H_0$: $\deg_{exp} \leq \deg_{alt}$, $H_1$: $\deg_{exp} > \deg_{alt}$. The null hypothesis is rejected at significance level α=0.01 with p-value of 0.0007. This suggests that with high probability, experts tend to interact more prior to important real world cyber-security breaches than other users who randomly post CVEs.

Now, a second t-test was considered where the present system randomly picks 4 weeks not in the weeks considered for the data breaches, to pick users $U_{alt}$ with the same constraints. The same hypotheses as above is used and when the present system performs statistical tests for significance, it was found that the null hypothesis is not rejected at α=0.01 with a p-value close to 0.05. This empirical evidence from the t-test also suggests that the interactions with $\exp_\tau$ are more correlated with an important cyber-security incident than the other users who post CVEs not in top CPE groups, and therefore it is better to focus on users exhibiting the desired properties as experts for cyber attack prediction. Note that the t-test evidence also incorporates a special temporal association since the present system collected events from three interleaved timeframes corresponding to the event dates.

Next, the following graph based features are described that are used to compute $\mathcal{T}_{x,j}[t]$ at time t, for which the relevant experts exp, are also taken as input. Four network features are described that capture this intuition behind the attention broadcast by these users—the idea is that a cyber-adversary looking to thwart the prediction models from working by curating similar reply networks using bots, would need to not only introduce such random networks but would also have to get the desired attention from these experts which could be far challenging to achieve given that human attention is known to be different compared to bots.
User/Forum Statistics Features The present system try to determine whether the forum or user posting statistics are themselves any indicators of future cyber-attacks—for this the present system computes Forum/User Statistics as described in Table I.
Network Centralities Features In addition, several network Centrality features mentioned in Table I were tested. The purpose is to check whether the emergence of central users in the reply network $G_t$, t ∈ τ can be good predictors of cyber-attacks. It was noted that in this case, the present system only uses the daily reply networks to compute the features unlike the expert centric network features where the present system uses.

Graph Conductance. Social networks are fast mixing: this means that a random walk on the social graph converges quickly to a node following the stationary distribution of the graph. Applied to social interactions in a reply network, the intuition behind computing the graph conductance is to understand the following: bounds of steps can be computed within which any attention on a post would be successfully broadcast from the non-experts to the experts when a post closely associated with an attack. One way of formalizing the notion of graph conductance φ is:

$$\phi = \min_{X \in V : \pi(X) <} \phi_X$$

where $\phi_X$, X being the set of experts here is defined as $\phi \text{Experts} =$ $$\frac{\sum_{x \in \exp_\tau} \sum_{y \in V_\tau \setminus \exp_\tau} \pi(\exp_\tau) P_{xy}}{\pi(\exp_\tau)},$$

and $\pi(\cdot)$ is the stationary distribution of the network $G_{H_\tau,t}$. For subset of vertices $\exp_\tau$, its conductance $\phi$Experts represents the probability of taking a random walk from any of the experts to one of the users in $V_t\backslash\exp_\tau$, normalized by the probability weight of being on an expert.

Applied to the reply network comprising both experts and the regular users, the key intuition behind conductance as used here is: the mixing between expert nodes and the users of important posts is fast, while the mixing between expert nodes and regular nodes without important posts (in the view of importance as seeking attention) is slow. So higher the value of conductance here, higher is the probability that the experts are paying attention to the posts and so there is a good chance that the conversations on those days could be reflective of a cyber-attack in future.

Shortest paths. To understand the dynamics of distance between the non-experts and the set of experts prior to an attack, the shortest distance metric is computed between them as follows: where $s_{e,u}$ denotes the shortest path in the graph $G_{H_\tau}^{,d}$ from the expert e to a user u in the direction of the edges. Since the edges are formed in the direction of the replies based on time constraints, it also denotes how fast an expert replies in a thread that leads back in time to a post by u. Such distance metrics have been widely used in network analysis to understand the pattern of interactions.

Algorithm 1: Algorithm for computing Common Communities (CC)

Input: $\exp_\tau$, $G_{H\tau}$, ($V_t$, $E_\tau$)
Output: CC($\exp_\tau$, $V_t\backslash\exp_\tau$) · the number of communities shared by $V_t\backslash\exp_\tau$ with $\exp_\tau$ at t
1 communities = Louvain_community($G_{H\tau}$); // dictionary storing mode to comminuty index mapping
2 $c_{expSet}$ ← ( ) ;
3 foreach user u ∈ $\exp_\tau$ do
4 | $c_{expSet}$.add(communities[u]) ;
5 end
6 $V_{H\tau,t}$ ← $V_{H\tau}$ ∪ $V_t$ ;
7 $E_{H\tau,t}$ ← $E_{H\tau}$ ∪ $E_t$ ;
8 CC($\exp_\tau$, $V_t\backslash\exp_\tau$) ← 0 ;   // stores count
/* Iterate over the users in $V_t$ who have not been assigned communities from $H_\tau$           */
9 foreach user u ∈ $V_t$ do
10 | if u ∈ $V_{H\tau}$ and communities(u) ∈ $c_{expSet}$ then
11 |   | CC($\exp_\tau$, $V_t\backslash\exp_\tau$) += 1;
12 | end
13 | else Algorithm 1: Algorithm for computing Common Communities (CC)

14 |   | foreach user u ∈ $\exp_\tau$ do
    |   |   | /* Condition 1                        */
15 |   |   | if (v,u) ∈ $E_{H\tau,t}$ then
16 |   |   |   | CC($\exp_\tau$, $V_t\backslash\exp_\tau$) += 1;
17 |   |   |   | break ;
18 |   |   | end
    |   |   | /* Condition 2                        */
19 |   |   | foreach user n ∈ inNeighbors($E_{H\tau,t}$), u do
20 |   |   |   | if communities(n) ∈ $c_{expSet}$ then
21 |   |   |   |   | CC($\exp_\tau$, $V_t\backslash\exp_\tau$) += 1;
22 |   |   |   |   | break ;
23 |   |   |   | end
24 |   |   | end
25 |   | end
26 | end
27 end
28 return CC($\exp_\tau$, $V_t\backslash\exp_\tau$)

Expert Replies. To analyze whether experts reply to users more actively when there is an important discussion going on surrounding any vulnerabilities or exploits, the number of replies by an expert to users in $V_t\backslash\exp_\tau$ are computed. The number of out-neighbors of $\exp_\tau$ considering $G_{H_\tau,t}$ are calculated.

Common Communities. To evaluate the role of communities in the reply network and to assess whether experts engage with selected other users within a community when an information gains attention and could be related to vulnerability exploitation, community detection is used on the networks $G_{H_\tau}$. The Louvain method is used to extract the communities from a given network. Since it is not computationally feasible to compute communities in $G_{H_\tau,t}$ for all the time points t∈τ, first all the communities for the users in the historical network $G_{H_\tau}$ are computed. Following this, an approximation based on heuristics is used to compute the communities of new users $V_{new}=V_{H_\tau,t}\backslash V_{H_\tau}$. Let $c_{experts}$ denote the set of communities that users in $\exp_\tau$ belong to following the call to Louvain method in Line 1 of Algorithm 1. Let c(u) denote the community index of a user u. The common communities measure is defined as follows: CC($\exp_\tau$, $V_t\backslash\exp_\tau$)={ $\mathcal{N}$ (c(u))|c(u)∈$c_{experts}$∧u∈$V_t\backslash\exp_\tau$}, that is it measures the number of non-experts at time t∈τ that share the same communities with $\exp_\tau$. Two approximation constraints are used and demonstrated in Lines 16-25 of Algorithm 1 to assign a new user it u∈$V_{new}$ to an expert community as follows:

TABLE 2

List of features used for learning. Each feature $\tau_x$ is computed separately across forms.

| Group | Features | Description |
|---|---|---|
| Expert centric | Graph Conductance | $\tau_x[t] = \dfrac{\sum_{x\in exp_\tau}\sum_{y\in V_t\backslash exp_\tau}\pi(\exp_\tau)P_{xy}}{\pi(\exp_\tau)}$ | where $\pi(\cdot)$ us the stationary distribution of the network $H_{H_\tau,t}$, $P_{xy}$ denotes the probability of random walk from vertices x to y. The conductance represents the probability of taking a random walk from any of the experts to one of the users in $V_t\backslash\exp_\tau$, normalize by the probability weight of being on an expert.

| | | |
|---|---|---|
| | Shortest Path | $\tau_x[t] = \dfrac{1}{|\exp_\tau|}\sum_{e\in exp_\tau}\min_{u\in V_t\backslash exp_\tau} s_{e,u}$ | where $s_{e,u}$ denotes the shortest path from an expert e to user u following the direction of edges.

TABLE 2-continued

List of features used for learning. Each feature $\tau_x$ is computed separately across forms.

| Group | Features | Description |
|---|---|---|
| | Expert replies | $\tau_{x[t]} = \frac{1}{|\exp_\tau|}\sum_{e \in exp_\tau} |OutNeighbors(e)|$ |
| | | where OutNeighbors(·) denotes the out neighbors of user in the network $G_{H_\tau,t'}$. |
| | Common Communities | $\tau_x[t] = \{N(c(u)|c(u) \in c_{experts} \wedge u \in V_t\backslash\exp_\tau\}$ where c(u) denotes the community index of user u, $c_{experts}$ that of the experts and N (·) denotes a counting function. It counts the number of users who share communities with experts. |
| Forum/ User Statistics | Number of threads | $\tau_x[t] = |\{h|thread\ h\ was\ posted\ on\ t\}|$ |
| | Number of users | $\tau_x[t] = |\{h|thread\ u\ posted\ on\ t\}|$ |
| | Number of expert threads | $\tau_x[t] = |\{h|thread\ h\ was\ posted\ on\ t\ by\ users\ u \in experts\}|$ |
| | Number of CVE mentions | $\tau_x[t] = |\{CVE|CVE\ was\ mentioned\ in\ some\ post\ on\ t\}|$ |

Condition 1: If an expert has an incoming edge to u, the count of common communities is increased by 1.

Condition 2: If u has a incoming neighbor who shares a community in the set of communities of experts, the count of common communities is increased by 1. This is shown in Line 19 in the call to the InNeighbors( ) method.

User/Forum Metadata Features

In addition to the network features, the following forum based statistics are computed for a forum f at time point t: (1) The number of unique vulnerabilities mentioned in f at time t, (2) The number of users who posted in f, (3) The number of unique threads in f at time t, and (4) The number of threads in which there was at least one expert post among all the posts in f at t.

A brief summary of all the features used in this disclosure is shown in Table 2.

Training Models for Prediction

In this section, how the time series features $\mathcal{T}_{x,f}$ across forums in F described in the preceding section to predict an attack at any given time point t is explained. Two models are considered for the framework: (1) a supervised learning model in which the time series $\mathcal{T}_x$ is formed by averaging $\mathcal{T}_{x,f}$ across all forums in f∈F at each time point t and then using machine learning models for the prediction task and, (2) an unsupervised learning model in which the time series $\mathcal{T}_{x,f}$ is taken for each feature and each forum f separately and then use dimensionality reduction techniques across the forums dimension. Following this, anomaly detection methods are used for the prediction task—this model does not use the training span ground truth attack data and directly works on features in the training and test span to predict attacks. However, in the supervised learning scenario separate prediction models are built for each attack type in A and for each organization separately. The two learning models are not used in conjunction nor do is data combined from different attack types together. The attack prediction problem is treated in the present disclosure as a binary classification problem in which the objective is to predict whether there would be an attack at a given time point t (Refer FIG. 14). Since the incident data in this paper contains the number of incidents that occurred at time point t, a label of 1 for t is assigned if there was at least one attack at t and 0 otherwise.

Supervised Learning

The technical details of the machine learning model that learns parameters based on the given training labels of different attack types in A in the training span are discussed and then used to predict whether an organization E would be vulnerable to an attack of some type in A at t—it is noted again that different models are built for each attack type in A for E, so predicting for each type means that different models are learned for the types, however the set of time series features gathered in the previous step as input is consistent across all models. Two parameters are used: δ that denotes the start time prior to t from where the features for prediction and η, the time span (window), are considered for the features to be considered. An illustration is shown in FIG. 2 here to predict an attack occurrence at time t, the features are used for each time t∈[$t_{-\eta-\delta}$, $t_{-\delta}$]. Logistic regression is used with longitudinal ridge sparsity that models the probability of an attack as follows:

$$P(\text{attack}(t)) = 1 \mid X) = \frac{1}{1 + e^{-(\beta_0 + \sum_{k=\eta+\delta}^{\delta} \beta_k x_{t-k})}} \quad (1)$$

The final objective function to minimize over N instances where N here is the number of time points spanning the attack time frame is: $1(\beta) = -\Sigma_{i=1}^{N}(y_i(\beta_0 + x_i^T\beta) - \log(1 + \exp^{\beta_0 + x_i^T\beta}) + \lambda\ \beta^T\beta \cdot T$. To obtain the aggregate time series $\mathcal{T}_x$ from individual forum features $\mathcal{T}_{x,f}$ the values across all forums are averaged for each time point. Here each feature is used separately although later the combinations of features together with sparsity constraints are discussed.

Unsupervised Learning

Now, the unsupervised learning model is discussed that directly takes as input the time series features in the training span as input and predicts the attacks for types in A on an organization E in the test span. However, unlike the supervised model, this model's prediction output does not depend on the type of attacks or the organization—E. It produces the same output for any attack—a point of interest lies in how anomalies from such unconventional signals in the darkweb correlate with the attacks in the real world. Informally, anomalies are patterns in data that do not conform to a well-defined notion of normal behavior. The problem of finding these patterns is referred to as anomaly detection. The importance of anomaly detection comes from the idea that anomalies in data translate to information that can explain actionable deviations from normal behavior thus leading to a cyber-attack. Subspace is used based anomaly detection methods that take as input, $\mathcal{T}_{x,f}$, aggregates them across all forums and finds anomalies in the cumulative time series for feature x. Motivation is derived for this technique from the widely used projection based anomaly detection methods that detects volume anomalies from the time series of network link traffic. Additionally, there have been techniques in graph based anomaly detection that finds graph objects that are rare and considered outliers. However, the motivation behind using anomaly detection does not lie from a feature analysis perspective or finding anomalous users but from a time series perspective—it is observed that there could be spikes in time series of the same feature in different forums on different days. The question is how to aggregate information from these spikes together instead of averaging them to an extent that the spikes die out in the aggregate. From that perspective, a goal is to be able to filter out the spikes from the same feature computed in different forums while projecting the dimension space of several forums to a 1-dimensional subspace. The overall procedure for detecting anomalies from the time series data on each feature has been described through the following steps. The subscript x is again dropped to generalize the operations for all features.

Aggregating time series. A matrix Y is created with dimensions (#time points)×(F), the rows denoting values at a single time step t for forums f∈F. While Y denotes the set of measurements for all forums F, y, a vector of measurements from a single timestep t, is also frequently worked with.

Subspace Separation. Principal Component Analysis (PCA) is a method to transform the coordinates of the data points by projecting them to a set of new axes which are termed as the principal components. PCA is applied on matrix Y, treating each row of Y as a point in W. Applying PCA to Y yields a set of F principal components $\{v\}_{i=1}^{F}$. In general, the kth principal component $v_k$ is:

$$v_k = \underset{\|v\|=1}{\mathrm{argmax}} \left\| \left( Y - \sum_{i=1}^{k-1} Y v_i v_i^T \right) v \right\|.$$

The principal axes (components) are determined by choosing the first few components that capture the maximum variance along their direction. Once these principal axes have been determined, the matrix Y can be mapped onto the new axes leading to as residual or anomalous subspace.

For detecting anomalies, the vectors $y \in \mathbb{R}^F$ need to be separated at any timestep into normal and anomalous components. These will be referred to as the state and residual vectors of y. The key idea in the subspace-based detection step is that, once $S$ and $\tilde{S}$ have been constructed, the separation can be done by projecting y onto these subspaces. This y tends to be decomposed as: $y=\hat{y}+\tilde{y}$. For this, the set of principal components are arranged corresponding to the normal subspace ($v_1, v_2, \ldots, v_r$) as columns of a matrix P of size f×r where r denotes the number of normal principal axes determined from the previous step. $\hat{y}$ and $\tilde{y}$ can then be formed as:

$$\hat{y}=PP^T y=Cy \text{ and } \tilde{y}=(I-PP^T)y=\tilde{C}_y \quad (2)$$

where the matrix $C=PP^T$ represents the linear operator that performs projection onto the normal subspace, and $\tilde{C}$ likewise projects onto the residual subspace. Here $\hat{y}$ is referred to as the state vector and $\tilde{y}$ as the residual vector.

Figure 7A:
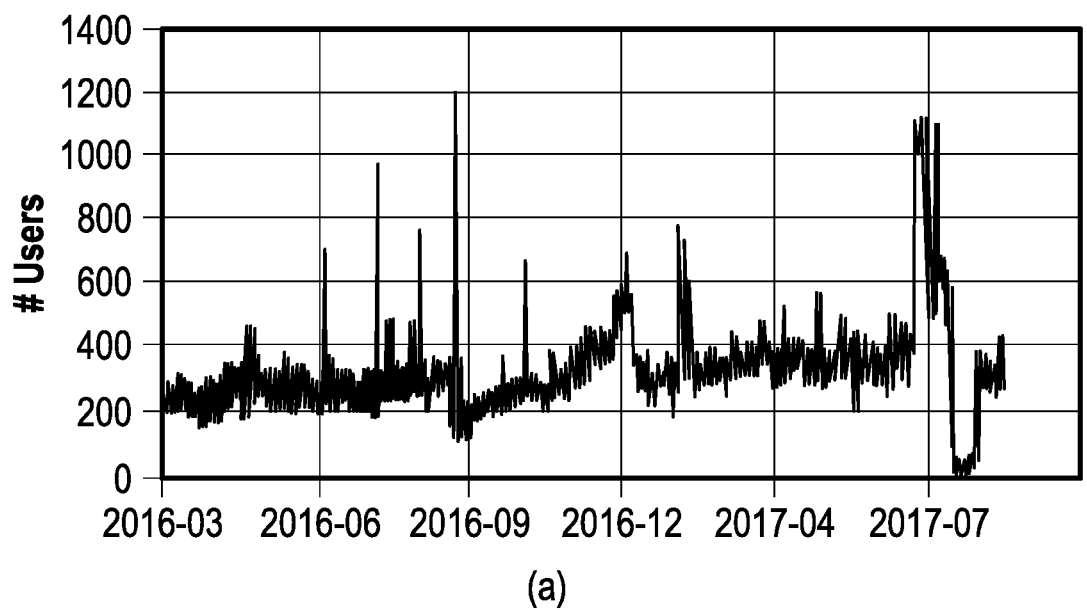
FIGS. 7A-7C are graphical representations of a time series for a number of user features computed on a daily basis and averaged across a set of forums.
Figure 7B:
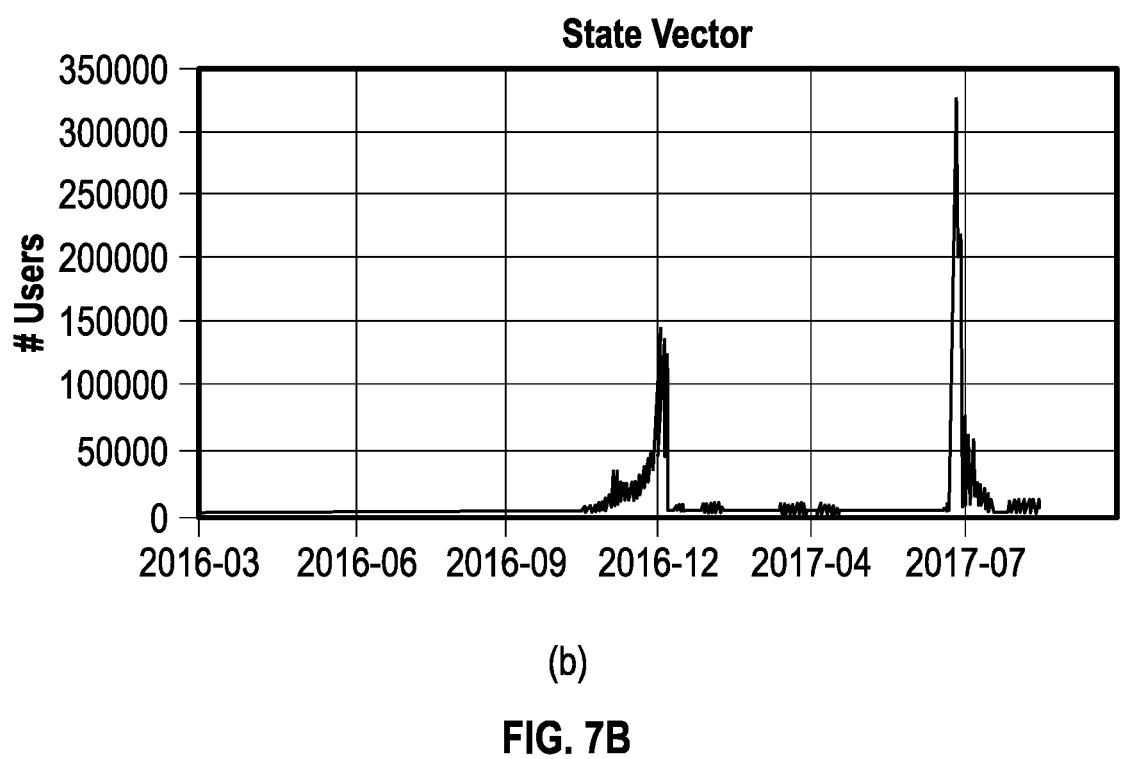
Figure 7C:
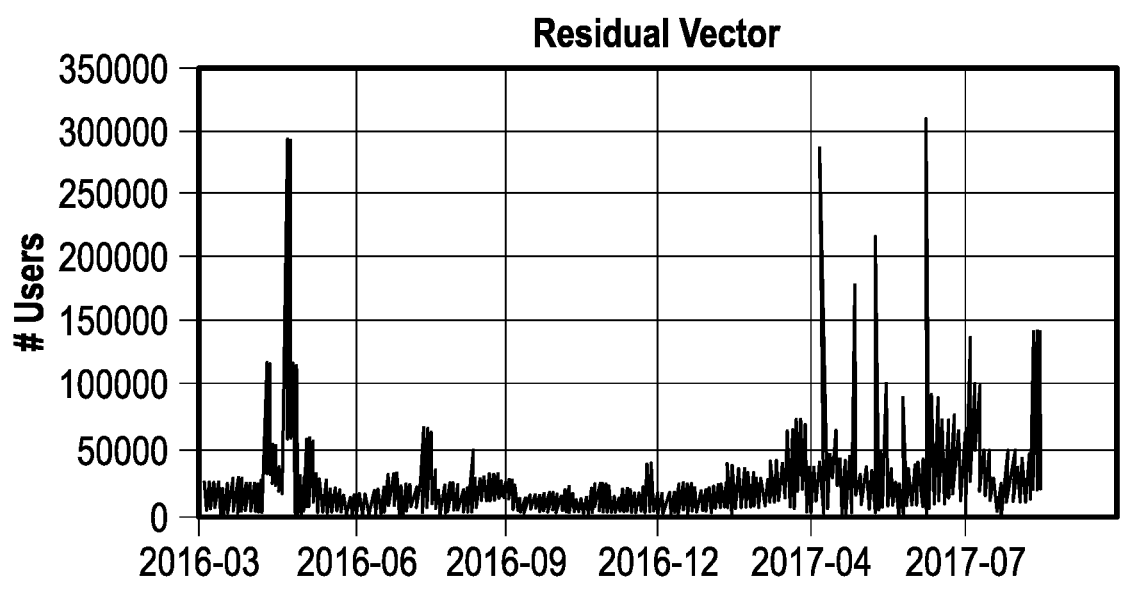
Figure 8A:
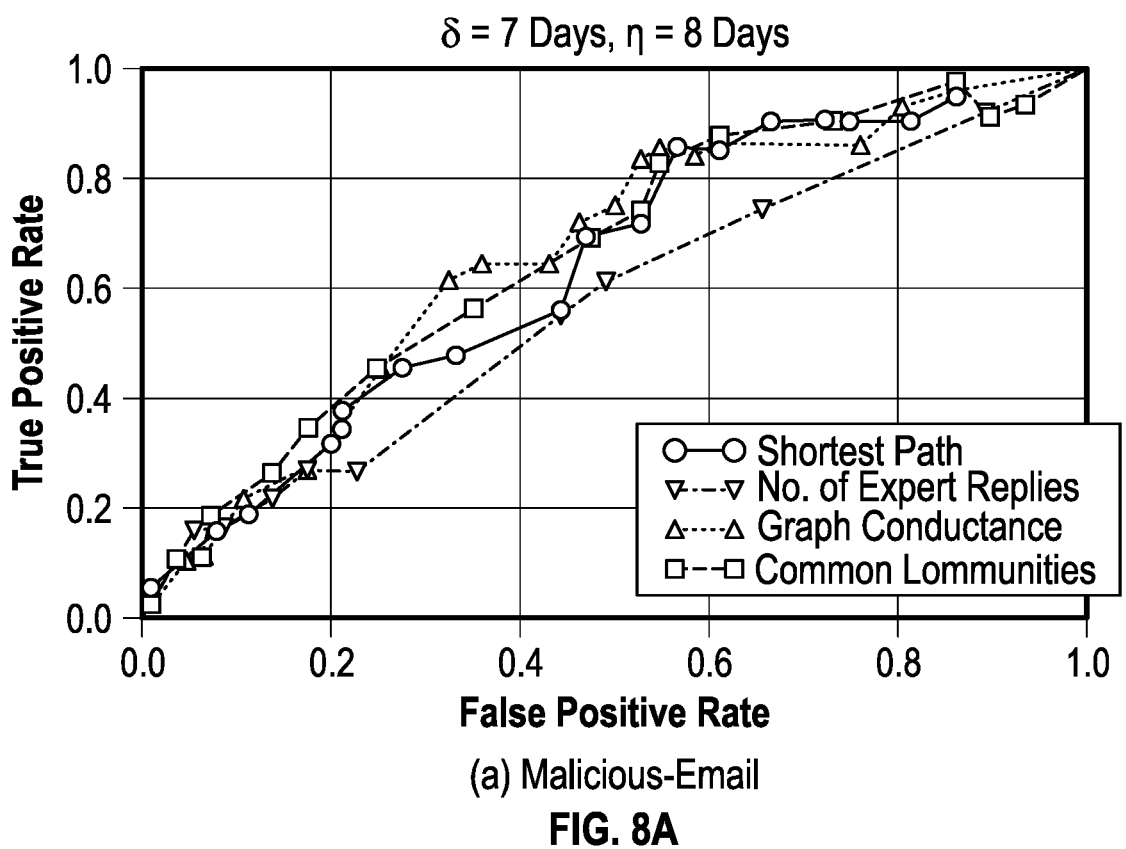
FIGS. 8A-8F are Receiver Operating Characteristic (ROC) curves for prediction using unsupervised anomaly detection methods.
Figure 8B:
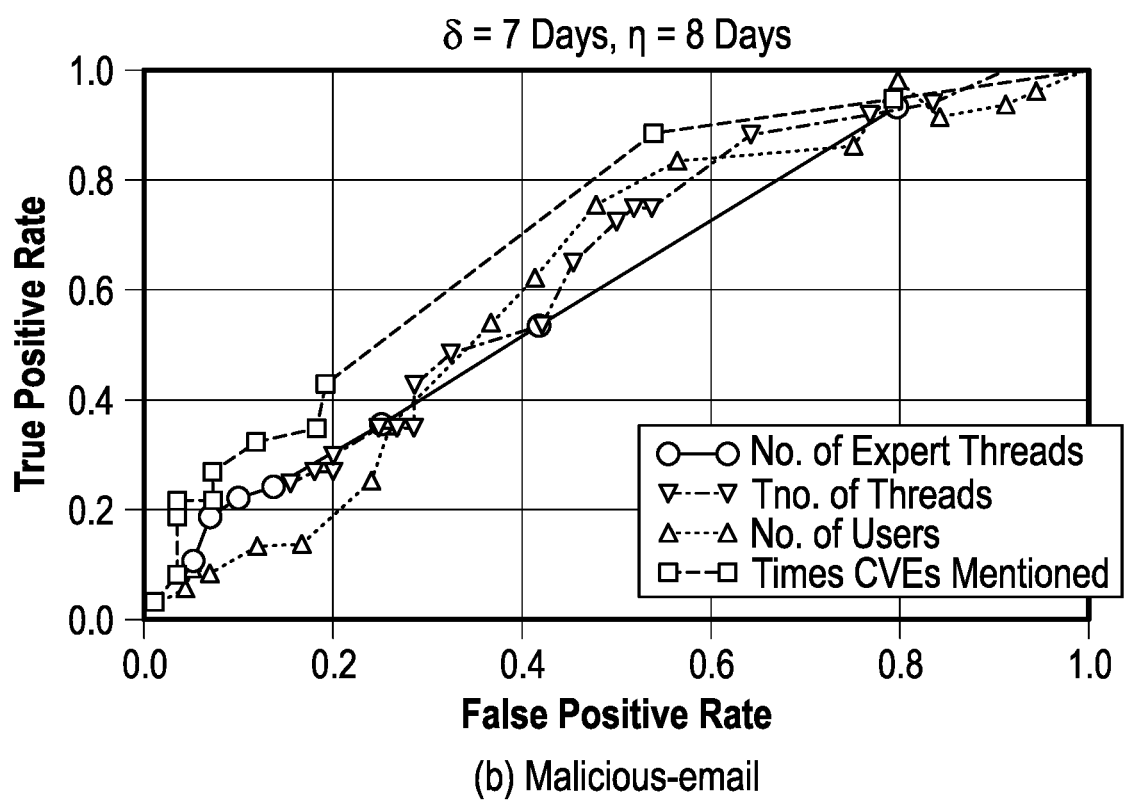
Figure 8C:
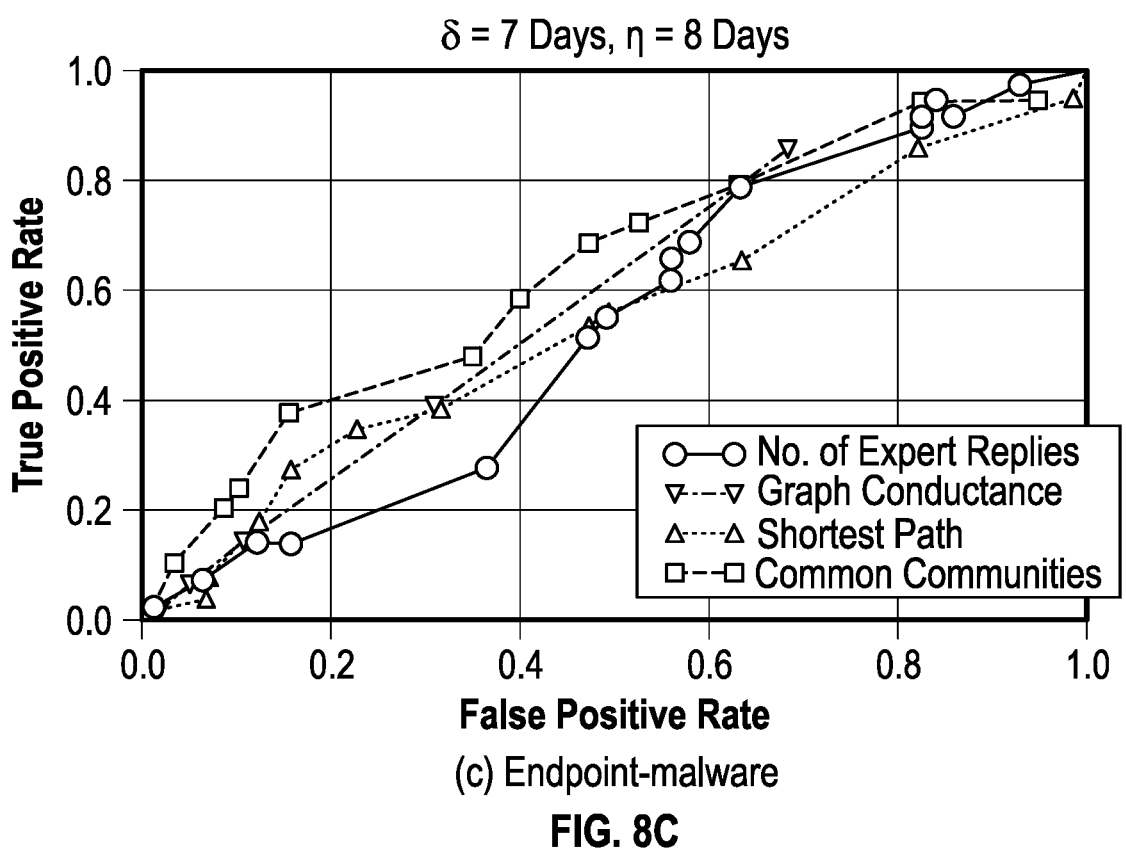
Figure 8D:
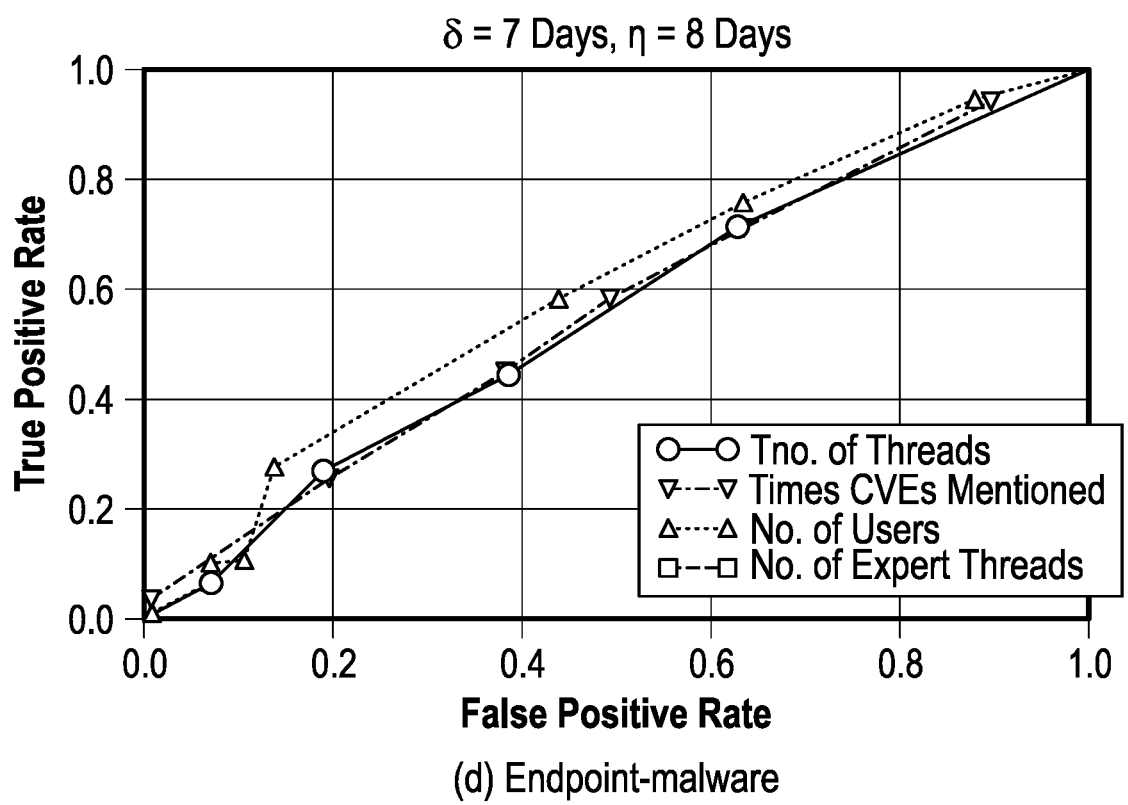
Figure 8E:
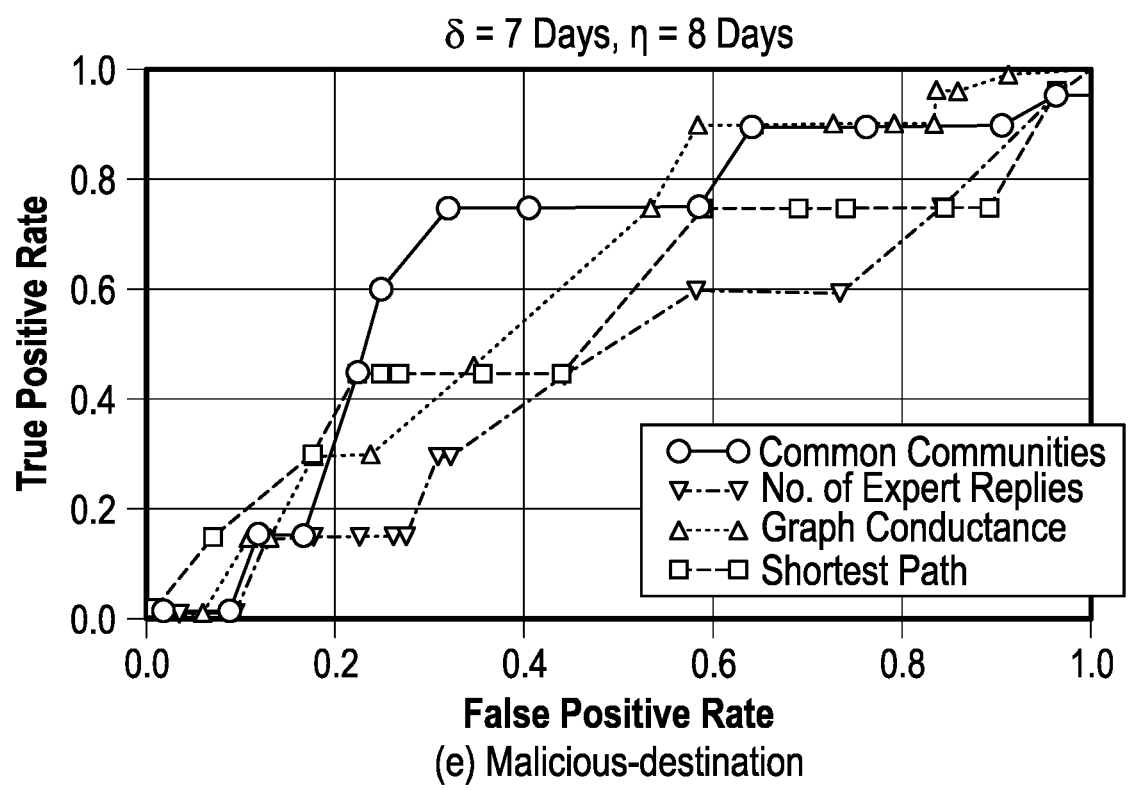
Figure 8F:
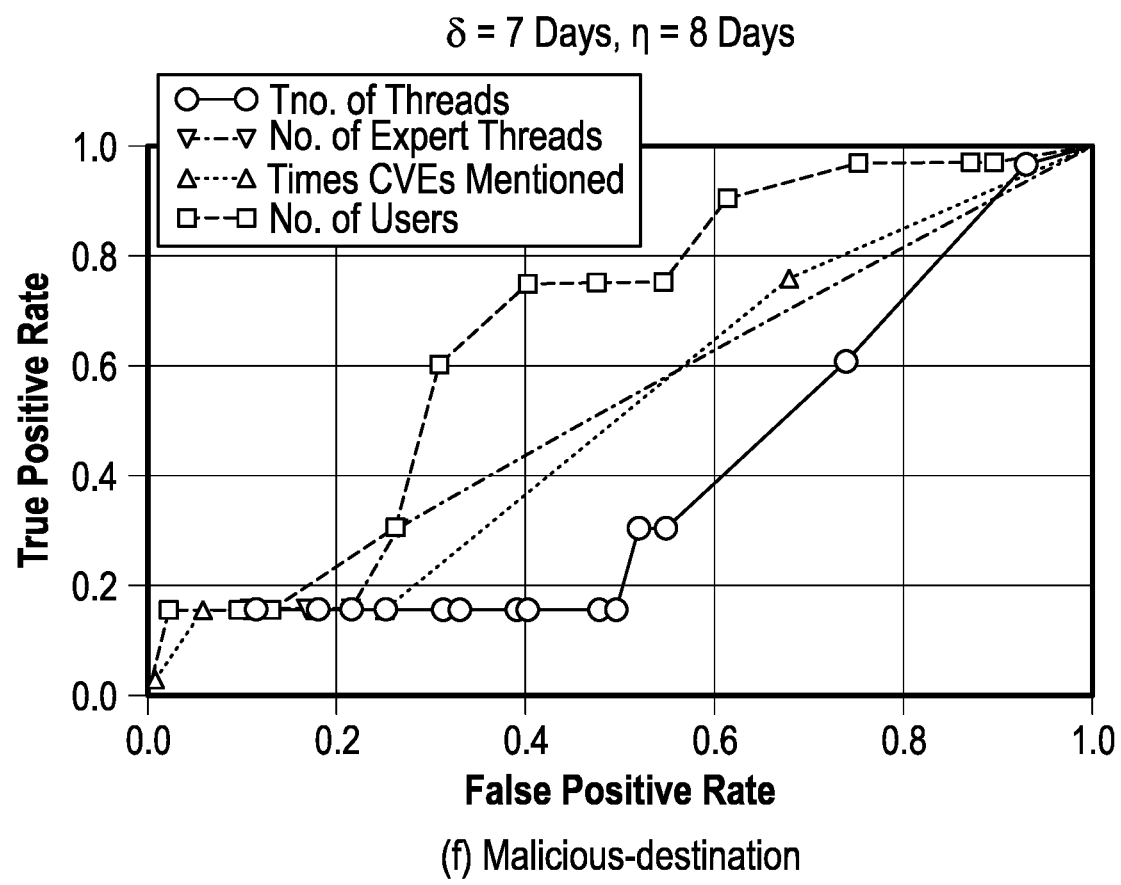

Detection of anomalies. The idea of anomaly detection is to monitor the residual vector that captures abnormal changes in y. Previously, there has been substantial research into designing statistical metrics for detecting abnormal changes in $\tilde{y}$ using thresholding and one of the widely used metrics is used, the squared prediction error (SPE) on the residual vector: $SPE \equiv \|\tilde{y}\| \equiv \|\tilde{C}y\|^2$. This gives the SPE residual vector and when combined over all time points gives us the residual vector time series denoted by $\mathcal{R}$. The SPE residual vector at any time point is considered normal if $SPE \leq \delta_\alpha^2$, where $\delta_\alpha^2$ denotes the threshold for the SPE at the 1–α confidence level. This threshold is kept dynamic and is used as a parameter for evaluating the anomaly based prediction models. FIGS. 7A-7C demonstrate the decomposition of the time series into the SPE state and residual vectors. While FIG. 7B captures most of the normal behavior, the SPE residual time series in FIG. 7C captures all the anomalies across all the forums. The key point of this anomaly detection procedure is that instead of monitoring the time series feature $\mathcal{T}_{x,f}$ separately across all forums in F for predicting cyber-attacks, it has been reduced to monitoring the SPE residual time series $\mathcal{R}_x$ for cyber-attacks.

Attack Prediction

Anomaly detection to Attack prediction. Following the subspace projection method to obtain $\mathcal{R}_x$ denoting the SPE residual vector, from the input time series feature $\mathcal{T}_{x,f}$ for all forums f∈F, threshold mechanisms are used on $\mathcal{R}_x$ to flag the time point t as an anomaly if $\mathcal{R}_x[t]$ is greater than a threshold value. Given any test time point t as the test instance, the times series vector $\mathcal{T}_x[t_{-(n+\delta)}; t_{(-\delta)}]$ that contains the information of feature x across all forums in F, is first projected on the anomalous subspace $\tilde{C}=I-PP^T$ given in Equation 2, if that time window is not already part of the training data. Following this, the squared prediction error (SPE) that produces a 1-dimensional vector $y_{test}$ of dimension $\mathbb{R}^{n \times 1}$ is calculated. The number of anomalous time points $t_a$, denoted by $\mathcal{N}(t_a)$, is counted with $t_a \in [t_{-(n+\delta)}, t_{(-\delta)}]$, time points that cross a chosen threshold. Finally, an attack at t is flagged if $$\mathcal{N}(t_a) >= \max\left(1, \frac{\zeta}{7}\right).$$

This metric gives a normalized count threshold over a week for any and for this window parameter being less than a week, whether there is at least one anomaly in that time gap is counted. The fact that the attack ground truth data is avoided to learn event based parameters has some pros and cons: while in the absence of sufficient data for training supervised models, such anomaly detectors can serve a purpose by investigating various markers or features for abnormal behavior leading to attack, the disadvantage is such methods cannot be tailored to specific events or specific attack types in organizations.

Supervised model prediction. For the logistic regression model, the features time series $\mathcal{T}_x$ are created for the test span and use it to calculate the probability of attack in Equation 1. When the probability is greater than 1, a positive attack case is outputted else a no-attack case is predicted.

Learning Models for Prediction

In this section, how the present system uses the time series data $\mathcal{T}_{x,f}$ to predict an attack at any given time point t is explained. A supervised learning model is considered in which the time series $\mathcal{T}_x$ is formed by averaging $\mathcal{T}_{x,f}$ across all forums in f∈F at each time point t and then using them for the prediction task. The present system treats the attack prediction problem in this disclosure as a binary classification problem in which the objective is to predict whether there would be an attack at a given time point t. Since the incident data in this disclosure contains the number of incidents that occurred at time point t, the present system assigns a label of 1 for t if there was at least one attack at t and 0 otherwise.

Figure 3:
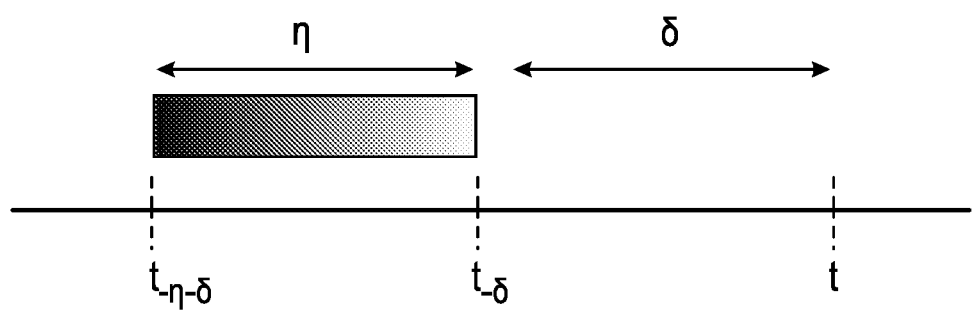
FIG. 3 is a graphical representation showing a temporal feature selection window for predicting an attack at time t.

The inventors studied the effect of longitudinal sparsity in high dimensional time series data, where an approach was proposed to assign weights to the same features at different time spans to capture the temporal redundancy. Two parameters were used: δ that denotes the start time prior to t from where the present system considers the features for prediction and η, the time span for the features to be considered. An illustration is shown in FIG. 3 where to predict an attack occurrence at time t, the features for each time $t_h \in [t_{-n-\delta}, t_{-\delta}]$ are used. Here the present system uses logistic regression with longitudinal ridge sparsity that models the probability of an attack as follows with X being the set of features and β being the vector of coefficients as shown in Equation 1.

One of the major problems of the dataset is the imbalance in the training and test dataset as will be described herein so in order to use all features in each group together for prediction, 3 additional regularization terms are used: the L1 penalty, the L2 penalty and the Group Lasso regularization. The final objective function can be written as:

$$l(\beta) = -\sum_{i=1}^{N} \log\left(1 + e^{-y_i(\beta^T x_i)}\right) + \frac{m}{2}\|\beta\|_2^2 + l\|\beta\|_1 + g \cdot GL(\beta) \quad (3)$$

where m, l and g are the hyperparameters for the regularization terms and the GL(β) term is $\Sigma_{g=1}^{G}\|\beta_{I_g}\|_2$ where $I_g$ is the index set belonging to the $g^{th}$ group of variables, g= 1 . . . G. Here each g is the time index $t_h \in [t_{-n-\delta}, t_{-\delta}]$, so this group variable selection selects all features of one time in history while reducing some other time points to 0. It has the attractive property that it does variable selection at the temporal group level and is invariant under (groupwise) orthogonal transformations like ridge regression.

Experimental Evaluations

In the present disclosure, the granularity for each time index in the 𝒯 function is 1 day that is the present system computes feature values over all days in the time frame of the study. For incrementally computing the values of the time series, the present system considers the time span of each subsequence τ∈Γ as 1 month, and for each τ, H$_\tau$=three months immediately preceding τ is considered. That is, for every additional month of training or test data that is provided to the model, the present system uses the preceding three months to create the historical network and computes the corresponding features on all days in τ. For choosing the experts with an in-degree threshold, the present system selects a threshold of 10 to filter out users having in-degree less than 10 in $G_{H_\tau}$ from exp$_\tau$. For the centralities features, the present system sets k to be 50, that is the present system chooses the top 50 users sorted by that corresponding metric in Table I. The present system built different learning models using the ground truth available from separate event-types.

As mentioned earlier, this streaming nature of feature generation ensures the features are engineered relevant to the timeframe of attack prediction. For choosing the experts with an in-degree threshold, a threshold of 10 is selected to filter out users having in-degree less than 10 in $G_{H_\tau}$ from exp$_\tau$. This threshold is obtained by manually investigating a few experts in terms of their content of posts and it is found that beyond a threshold of 10, a lot of users get included whose posts are not relevant to any malicious information or signals.

For the reply network construction, there are 2 parameters: thresh$_{spat}$ and thresh$_{temp}$ corresponding to the spatial and temporal constraints. For setting both these constraints, a 2D grid search is used over these parameters by constructing the reply network using pairwise combinations of these 2 parameters. Following this, for each combination the in-degree distribution is fitted to power law with an exponent of 1.35. The pair combination which gives the minimum difference when the error arising from the degree distribution and $P(k) \sim k^{-1.35}$ is calculated is taken. Using this procedure thresh$_{spat}$=10 (posts) and thresh$_{temp}$=15 (minutes) were found to have the best fit in terms of the reply network created.

The hyper-parameters for the logistic regression model η and δ have been selected using a cross validation approach which is discussed briefly in the Results section. Similarly for detection of anomalies, the threshold parameter for the residual vector $\delta_\alpha^2$ is tested on different values and plot the ROC curve to test the performance. For the choice anomaly count threshold parameter ζ, such that a cyber-attack is tagged on t when the count of anomalies in the selected window $t_{-n-\delta}$, $t_{-\delta}$ crosses ζ, it is set to 1. The reason behind this is from manual observation where it is found every day on which there are spikes and therefore, as a simple method, an attack is attributed to a day if there was at least one anomaly in the time window prior to it. This parameter needs to be cross-validated but observations suggest that there would be very low precision in the performance when ζ is set to a high value.

As mentioned herein, a binary prediction problem is considered in the present disclosure wherein the present system assigns an attack flag of 1 for at least 1 attack on each day and 0 otherwise have the following statistics: for malicious-email, out of 335 days considered in the dataset, there have been reported attacks on 97 days which constitutes a positive class ratio of around 29%, for endpoint-malware the total number of attack days are 31 out of 306 days of considered span in the training dataset which constitutes a positive class ratio of around 26%, and for endpoint-ma/ ware there are a total of 26 days of attack out of a total of 276 days considered in the training set that spanned those attack days constituting a positive class ratio of 9.4%. For evaluating the performance of the models on the dataset, the time frame of each event is split into 70%-30% avenged to the nearest month separately for each event—type. That is the first 80% of time in months is taken as the training dataset and the rest 20% in sequence for the test dataset. The present system avoids a shuffle split as generally being done in cross-validation techniques in order to consider the consistency in using sequential information when computing the features. As shown in FIGS. 1A and 1B, since the period of attack information provided varies in time for each of the events, the present system uses different time frames for the training model and the test sets. For the event malicious email which remains the primary testbed evaluation event, the time period from October 2016 to June 2017 (9 months) in the Darkweb forums was considered for the training data and the period from July 2017 to August 2017 (3 months) as out test dataset, for the endpoint—malware, the present system uses the time period from April 2016 to September 2016 (6 months) as the training time period and June 2017 to August 2017 (3 months) as the test data for evaluation.

Figure 4A:
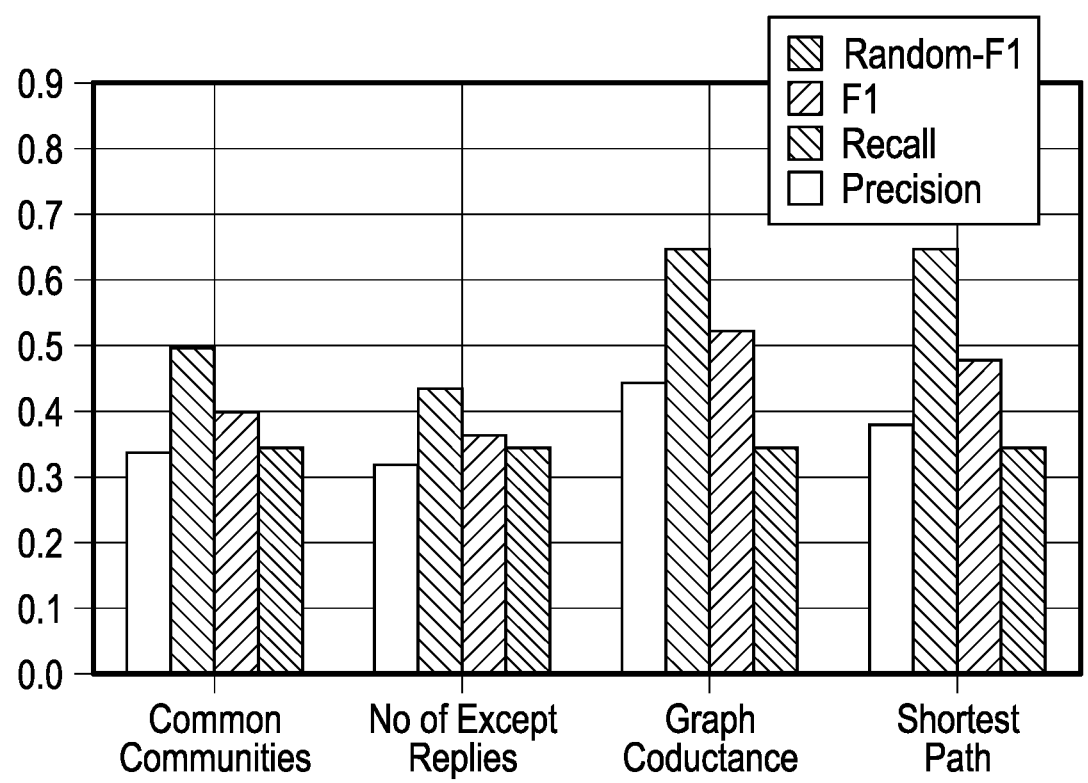
FIGS. 4A-4F are graphical representations of classification results for the features considering the logistic regression model.

A span of 1 week time window η was considered while keeping δ=8 days. From among the set of statistics features that were used for predicting malicious—email attacks shown in FIG. 4E, the best results were used using the number of threads as the signal for which a precision of 0.43, recall of 0.59 and an F 1 score of 0.5 against the random F 1 of 0.44 for this type of attacks are observed. From among the set of expert-centric features in FIG. 4A, the best results from graph conductance were obtained with a precision of 0.44, recall of 0.65 and an FI score of 0.53 which shows an increase in recall over the number of threads measure. Additionally, it was observed that the best features in terms of F1 score are graph conductance and shortest paths whereas number of threads and vulnerability mentions turn out to be the best among the statistics. For the attacks belonging to the type endpoint—malware, similar characteristics are observed for the expert-centric features were observed in FIG. 4B where a best precision of 0.34, recall of 0.74 and an F1 score of 0.47 against a random F1 of 0.35, followed by the shortest paths measure is obtained. However for the statistics measures the present system obtains a precision of 0.35, recall 0.61 and an F1 score of 0.45 for the vulnerability mentions followed by the number of threads which gives an F1 score of 0.43. Although the common communities features doesn't help much in the overall prediction results, in the following section a special case is described that demonstrates the predictive power of the community structure in networks. On the other hand, when the centralities features were investigated with respect to the prediction performance in FIG. 4C, it was found that just looking at network centralities does not help. The best values were obtained for malicious—email event predictions are from the outdegree and betweenness metrics both of which gives an F1 score of 0.41. Surprisingly, it was found that when the metrics are used for only the users with CVE mentions, the results are worse with the best F1 score for outdegree CVE having an F1 score of 0.38. This calls for more complex understanding of path structures between users than just focusing on user significance solely. The challenging nature of the supervised prediction problem is not just due to the issue of class imbalance, but also the lack of large samples in the dataset which if present, could have been used for sampling purposes. As an experiment, the present system also used Random Forests as the classification model, but any significant improvements in the results over the random case were not observed.

For the model with the Group lasso regularization in Equation 3, the present system set the parameters m, l, g and 0.3, 0.3 and 0.1 respectively. Better results were obtained for each group of features together on the malicious-email events with an F1 score of 0.55 for Expert centric, 0.51 with Forum/user statistics and 0.49 with network centrality based features.

Prediction in High Activity Weeks

One of the main challenges in predicting external threats without any method to correlate them with external data sources like darkweb or any other database is that it is difficult to validate which kinds of attacks are most correlated with these data sources. To this end, the present system examined a controlled experiment setup for the malicious— email attacks in which only the weeks which exhibited high frequency of attacks compared to the overall timeframe were considered: weeks having more than 5 attacks are considered in test time frame. These high numbers may be due to multiple attacks in one or few specific days or few attacks on all days. The present system ran the same supervised prediction method but evaluated them only on these specific weeks.

Figure 5A:
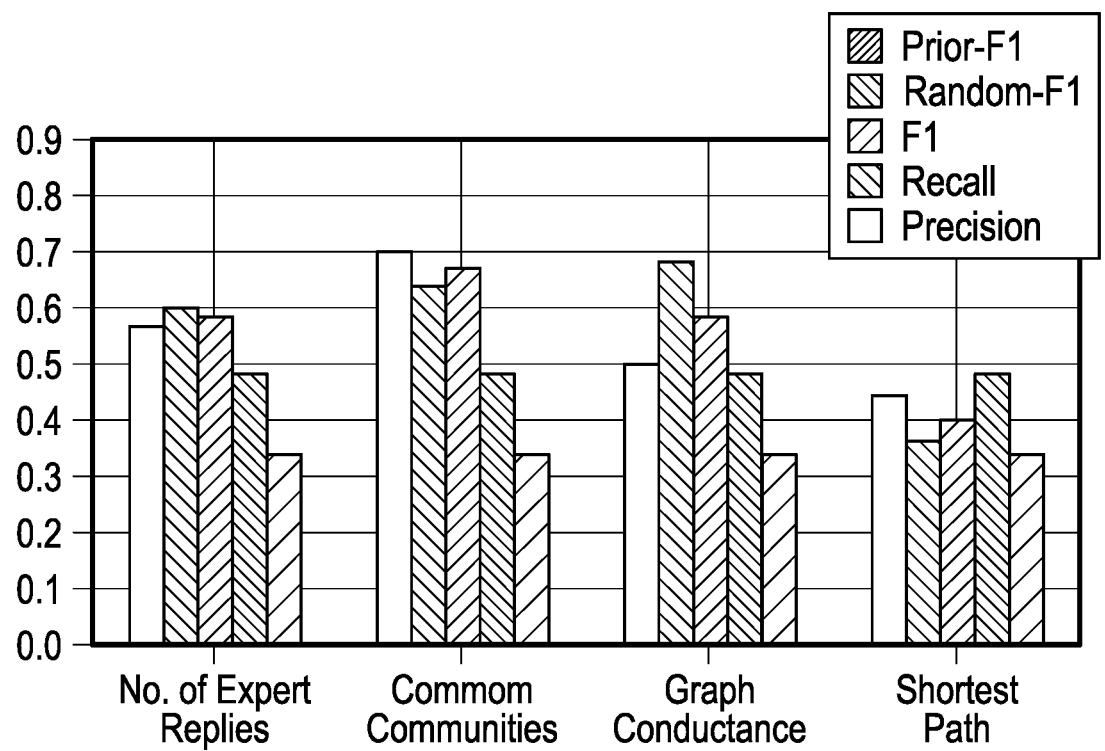
FIGS. 5A-5C are graphical representations for malicious—email attacks in high frequency weeks.
Figure 5B:
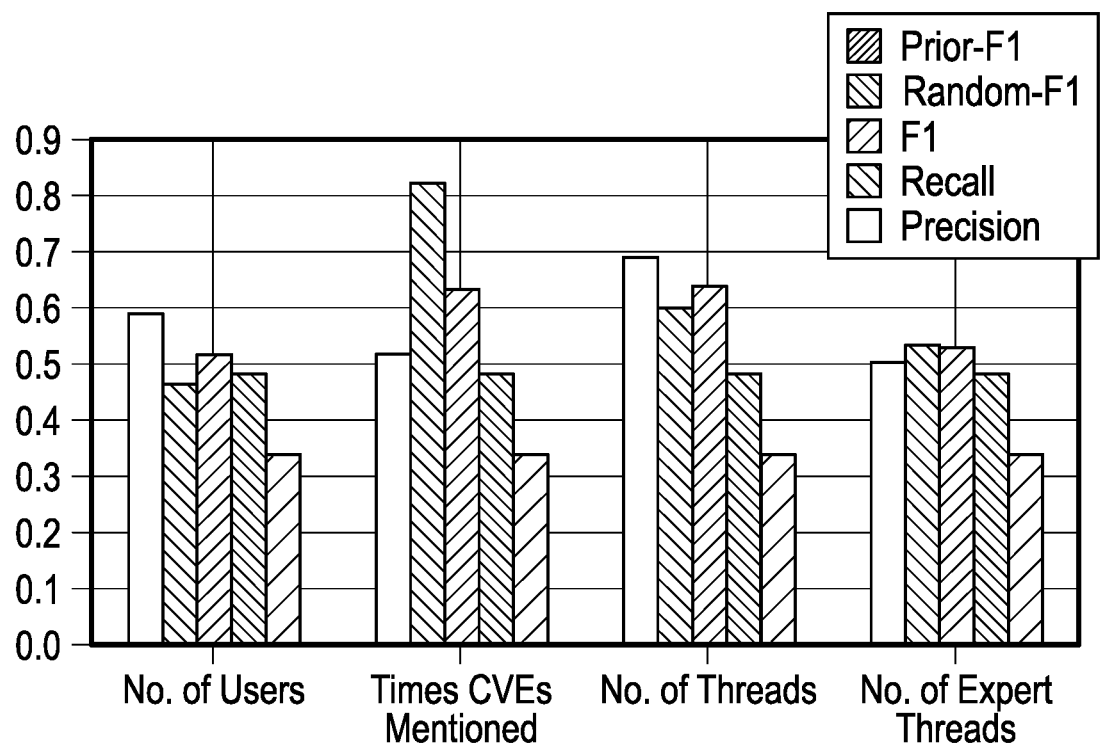
Figure 5C:
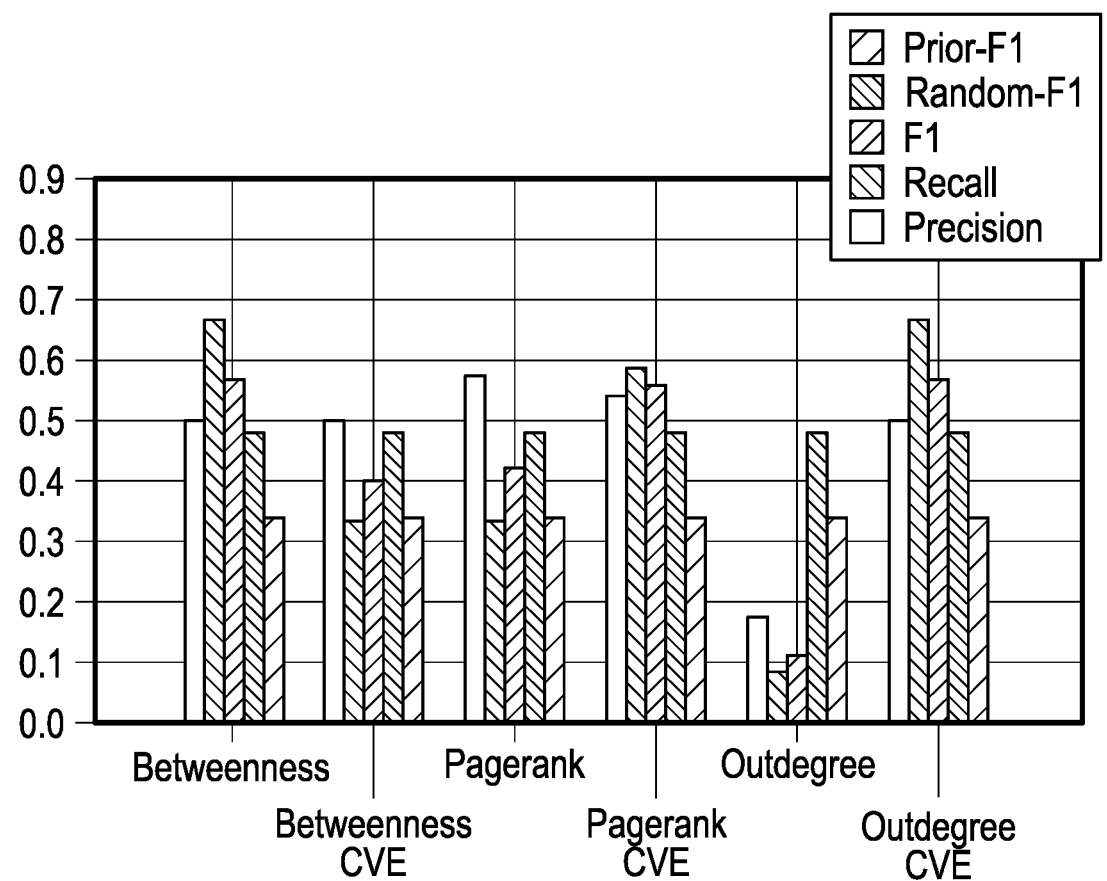

From the results shown in FIGS. 5A-5C, it was found that the best results were shown by the common communities feature having a precision of 0.7 and a recall of 0.63 and an F1 score of 0.67 compared to the random (no priors) F1 score of 0.48 and a random (with priors) F1 score of 0.34 for the same time parameters. Among the statistics measures, a highest F1 score of 0.63 was obtained for the vulnerability mentions feature. From among the set of centralities features, it is found that betweenness measure has the best F1 score of 0.58 with a precision of 0.5 and a recall of 0.78. This also suggests the fact that analyzing the path structure between nodes is useful since betweenness relies on the paths passing through a node. Additionally, it was found that unlike the results over all the days, for these specific weeks, the model achieved high precision while maintaining comparable recall emphasizing the fact that the number of false positives are also reduced during these periods. This correlation between the weeks that exhibit huge attacks and the prediction results imply that the network structure analytics can definitely help generate alerts for cyber attacks.

To demonstrate the effectiveness of the features on real world cyber-attacks, separate experiments are performed with the learning models previously described: while for the anomaly detection based prediction, the same set of features are used as the only input for attack prediction across different attack types, for the supervised model, different learning models are built using the ground truth available from separate attack types in A. Additionally only supervised classification is performed for the malicious-email and the endpoint-malware attack types leaving out malicious-destination due to lack of sufficient training data. As previously mentioned, a binary prediction problem is considered in the present disclosure—an attack flag of 1 is assigned for at least 1 attack on each day and 0 otherwise have the following statistics: for malicious-email, out of 335 days considered in the dataset, there have been reported attacks on 97 days which constitutes a positive class ratio of around 29%, for endpoint-ma/ware the total number of attack days are 31 out of 306 days of considered span in the training dataset which constitutes a positive class ratio of around 10%, and for endpoint-malware there are a total of 26 days of attack out of a total of 276 days considered in the training set that spanned those attack days constituting a positive class ratio of 9.4%. Table 3 shows the statistics of the training and test data for the 3 cyber attacks types from Armstrong. Although remedial diagnostics were not used in the learning models to account for this class imbalance, the absence of a large training dataset and the missing attack data information accounting for irregularities make a strong case for using sampling techniques to address these issues. One of the challenges in remedial diagnostics for imbalances in classes is that here it may be necessary to take into account the temporal dependencies while incorporating any sampling techniques as remedies. However, a complementary experiment is run using SMOTE sampling as a simple measure for introducing synthetic samples into the training dataset.

TABLE 3

Statistics of the training and test samples from Armstrong.

| | Train positive sample | Train negatvie samples | Test positive samples | Test negative samples |
|---|---|---|---|---|
| Malicious email | 65 | 178 | 32 | 60 |
| Endpoint Malware | 49 | 134 | 31 | 92 |
| Malware Destination | 7 | 115 | 8 | 84 |

Figure 1C:
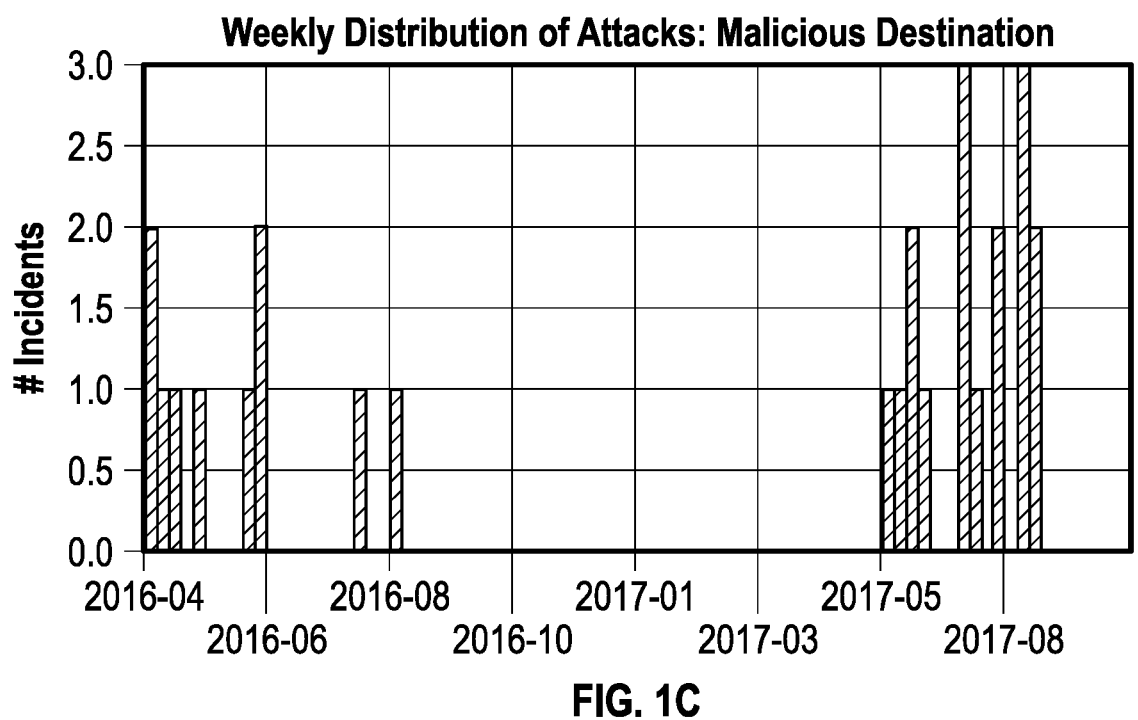

For evaluating the performance of the models on the dataset, the time frame of each event is split into 70%-30% averaged to the nearest month separately for each event—type. That is the first 70% of time in months is taken as the training dataset and the rest 30% in sequence for the test dataset. Shuffle split is avoided as generally being done in cross-validation techniques in order to consider the consistency in using sequential information when computing the features. As shown in FIG. 1, since the period of attack information provided varies in time for each of the events, different time frames are used for the training model and the test sets. For the event malicious email which remains the primary testbed evaluation event, the time period from October 2016 to May 2017 (8 months) is considered in the darkweb forums for the training data and the period from June 2017 to August 2017 (3 months) as the test dataset, for the endpoint—malware, the time period from April 2016 to September 2016 (6 months) is used as the training time period and June 2017 to August 2017 (3 months) as the test data for evaluation.

Unsupervised Model Prediction Performance

Here the subspace projection method is used to filter out anomalies from the SPE residual time series vector $\mathcal{R}_x$. These anomalies are then used to predict the attacks as described there and try to see the tradeoffs between the number of true alerts and the number of false alerts obtained. The first 8 principal components are considered among the 53 forums that have been considered. Among them the first 3 are used as the normal axes and the remaining 5 as the residual axes based on empirical evidence that shows these 3 components capture the maximum variance For evaluating the prediction performance, the ROC (Receiver Operating Characteristic) curves were examined for features over different spans of $\delta$ and $\eta$ but we present findings from the case where $\eta=8$ days and $\delta=7$ days as shown in FIGS. 8A-8F. However, general conclusions were not made for the parameters $\delta$ and $\eta$ based on the results. Each point in these ROC curves denotes a threshold among a set of values chosen for flagging a point in the vector obtained from the squared prediction error of the projected test input y, that crosses the threshold as an anomaly. The results are presented in each plot grouped by the event—type and the feature classes: forum statistics and graph based statistics. From the FIGS. 8A and 8B,for the event type malicious—email, the best AUC (Area Under Curve) results of 0.67 are obtained for the vulnerability mentions by users feature among the forum statistics groups and an AUC of 0.69 for graph conductance among the set of graph based features. For the event type malicious—destination, a best AUC of 0.69 was obtained for the common community count feature among the set of graph based features and a best AUC of 0.66 on the number of users at td among the forum statistics. For the event-type endpoint—malware, a best AUC of 0.69 was obtained on the number of users stats and 0.63 on the common communities CC feature. Empirically, it was found that among the network features examined that rely on the set of experts, it is not sufficient to just look at how these experts reply to other users in terms of frequency, shown by the results where they exhibit the least AUC in the unsupervised setting that was considered. The fact that common communities and the graph conductance turn out to be better predictors than just the shortest path distance or the number of replies by experts, suggest that experts tend to focus on posts of a few individuals when any significant post arises and hence, focusing on individuals who are close to these users in terms of random walks and communities would be favorable.

One of the reasons behind the poor performance of the detector on the malicious—destination type of attacks compared to malicious—email although the total number of incidents reported for both of them are nearly the same is that the average number of incidents for any week of attack for the 3 attack-types are: for malicious-email, there is an average of 2.9 attacks per week, for endpoint—malware, there is an average of 3.6 attacks per week and for malicious—destination, there are an average of 1.52 attacks per weeks. So although the number of incidents are similar, the number of days of attacks on which the attack occurs is lesser for malicious—destination attacks and which is important for the binary classification problem considered here.

Supervised Model Prediction Performance

For the logistic regression model, a span of 1 week time window $\eta$ is considered while keeping $\delta=8$ days similar to the unsupervised setting. Due to absence of sufficient positive examples, using this model for predicting attacks of type malicious-destination is avoided. From among the set of statistics features that were used for predicting malicious—email attacks shown in FIG. 4B the best results are observed using the number of threads as the signal for which a precision of 0.43, recall of 0.59 and an F1 score of 0.5 against the random F1 of 0.34 for this type of attacks are observed. From among the set of graph based features, the best results are obtained from graph conductance with a precision of 0.44, recall of 0.65 and an F1 score of 0.53 which shows an increase in recall over the number of threads measure. Additionally, it is observed that in case of supervised prediction, the best features in terms of F1 score are graph conductance and shortest paths whereas number of threads and vulnerability mentions turn out to be the best among the statistics. For the attacks belonging to the type endpoint—malware, similar characteristics are observed for the graph features where a best precision of 0.34, recall of 0.74 and an F1 score of 0.47 against a random F1 of 0.35 is obtained, followed by the shortest paths measure. However for the statistics measures a precision of 0.35, recall 0.61 and an F1 score of 0.45 is obtained for the vulnerability mentions followed by the number of threads which gives an F1 score of 0.43. Although the common communities features doesn't help much in the overall prediction results, in the following section a special case is described that demonstrates the predictive power of the community structure in networks. The challenging nature of the supervised prediction problem is not just due to the issue of class imbalance, but also the lack of large samples in the dataset which if present, could have been used for sampling purposes. As an experiment, Random Forests were also used as the classification model, but significant improvements in the results over the random case were not observed, suggesting the LR model with temporal regularization helps in these cases of time series predictions.

Figure 4B:
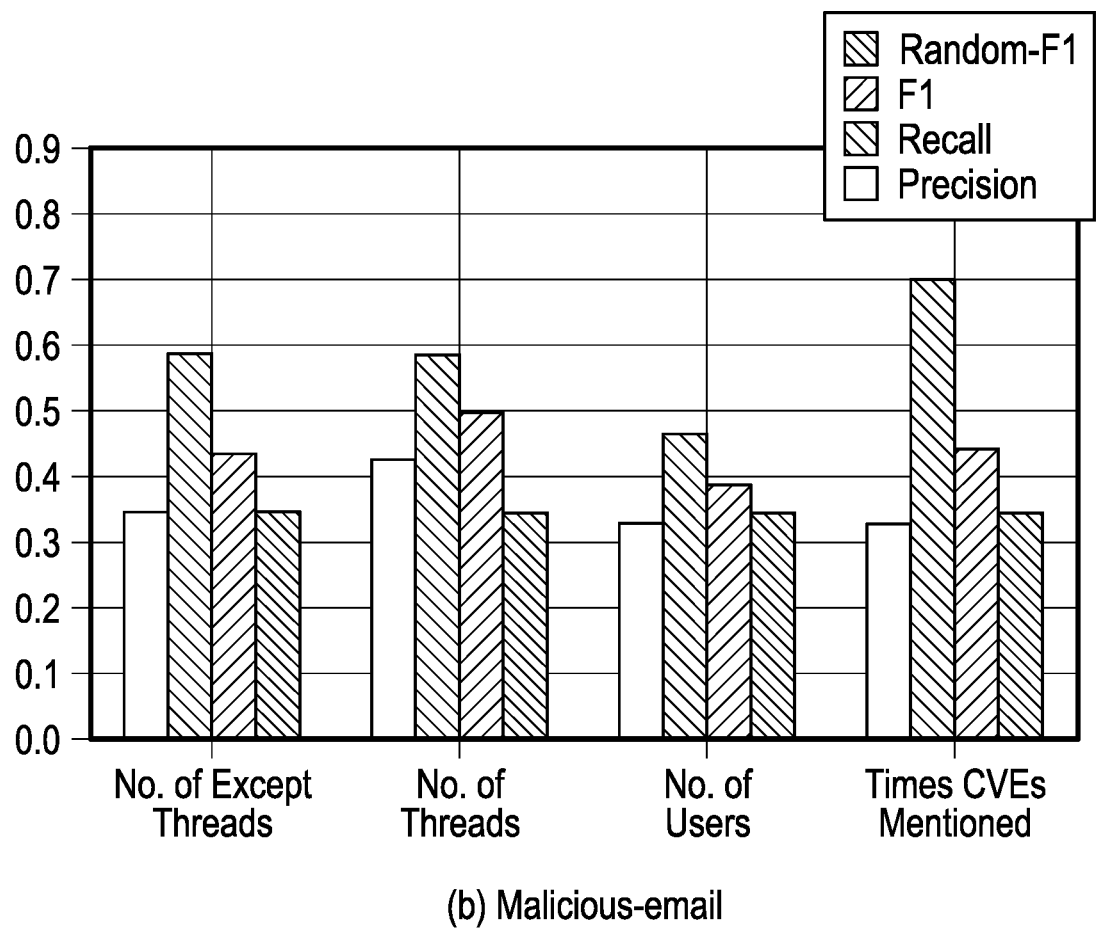
Figure 4C:
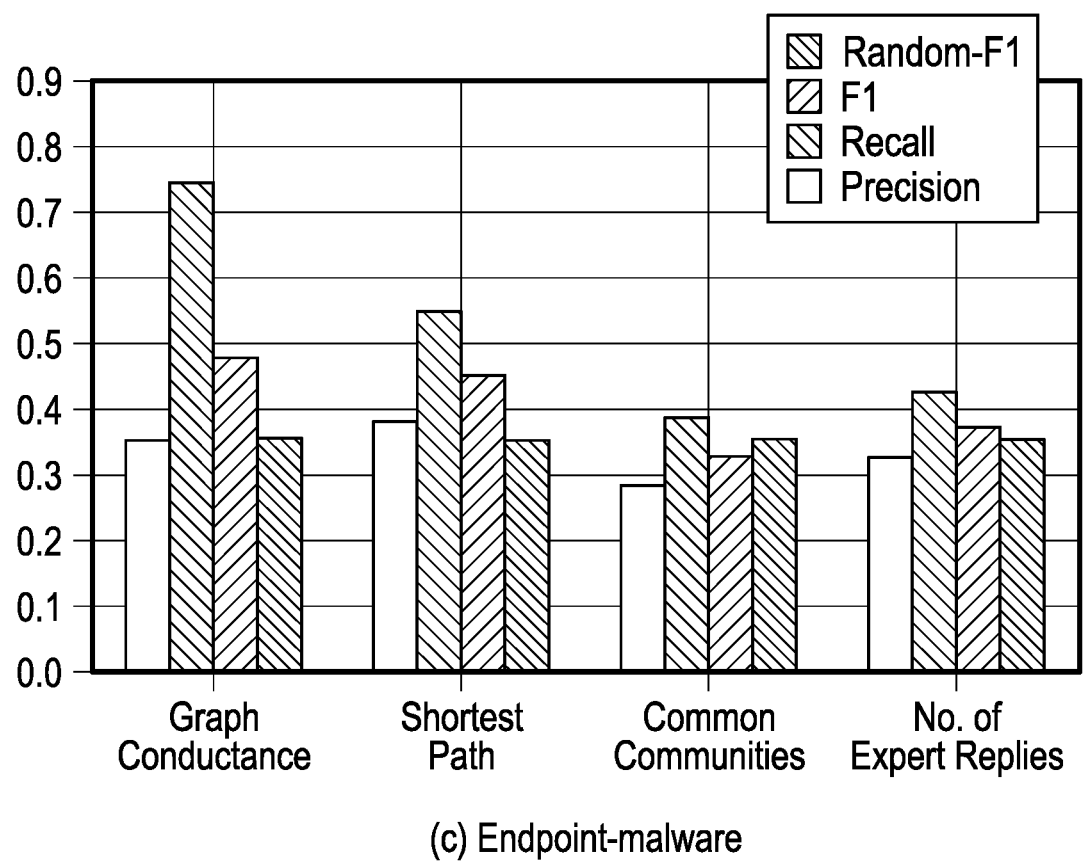
Figure 4D:
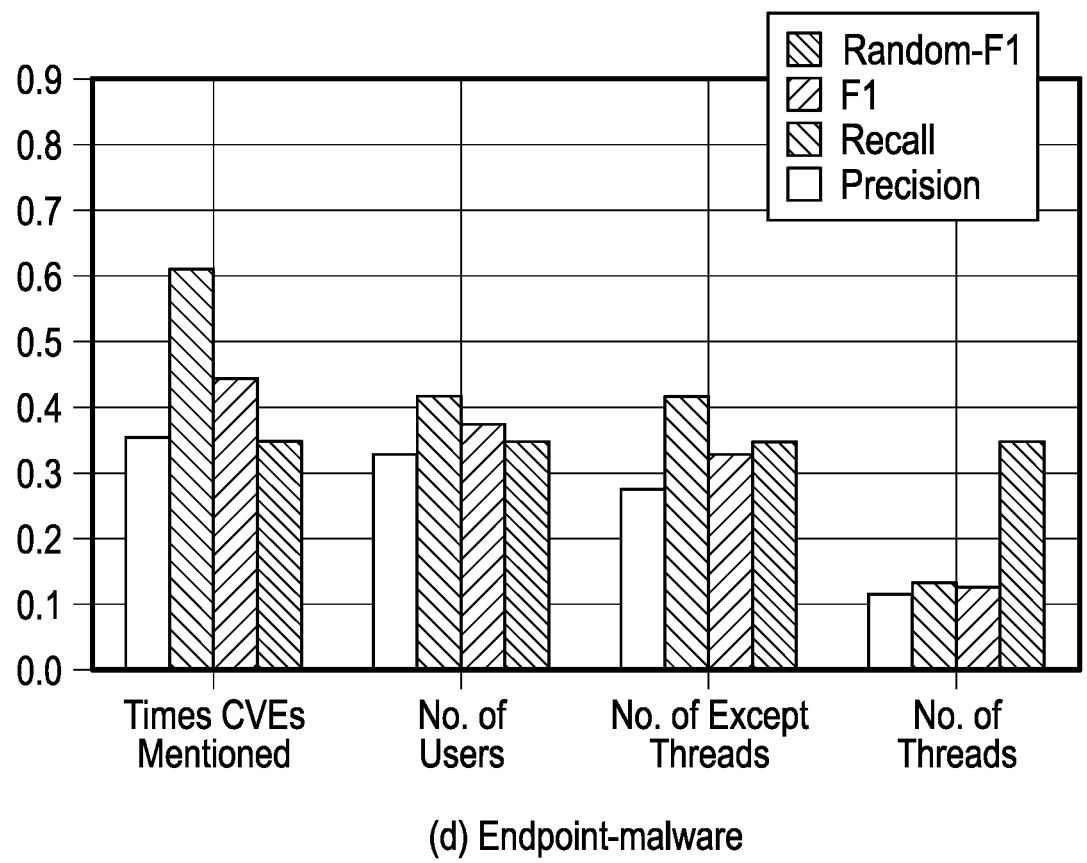
Figure 4E:
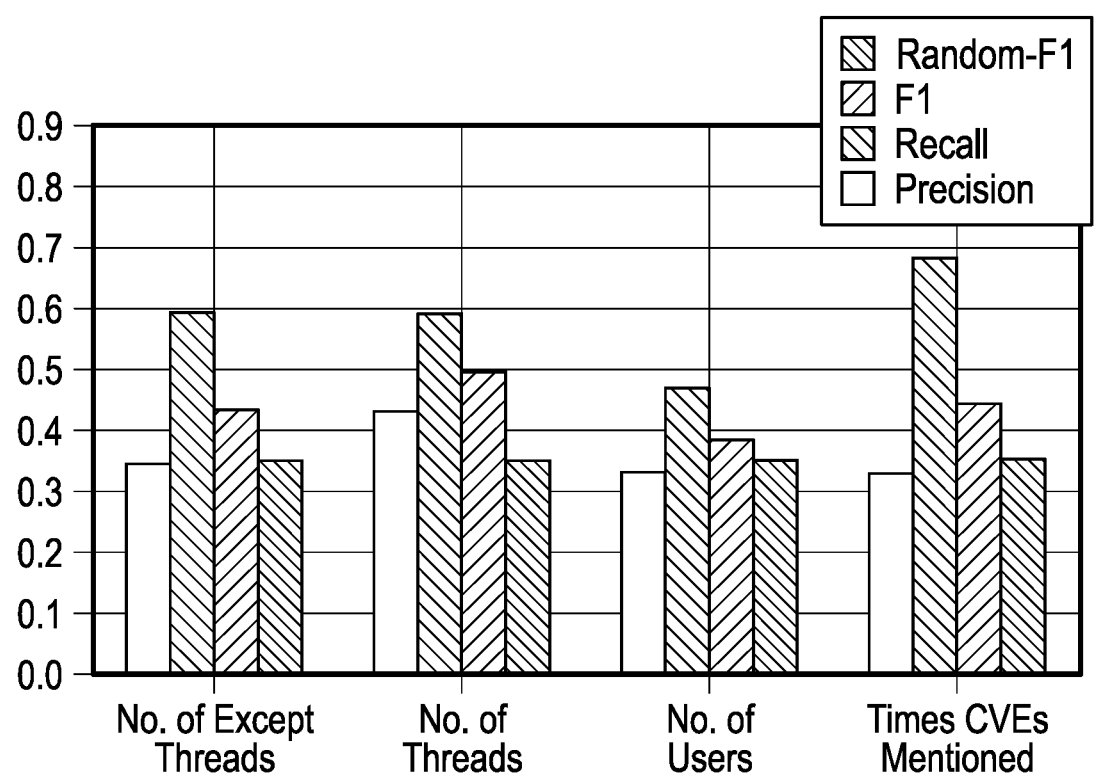
Figure 4F:
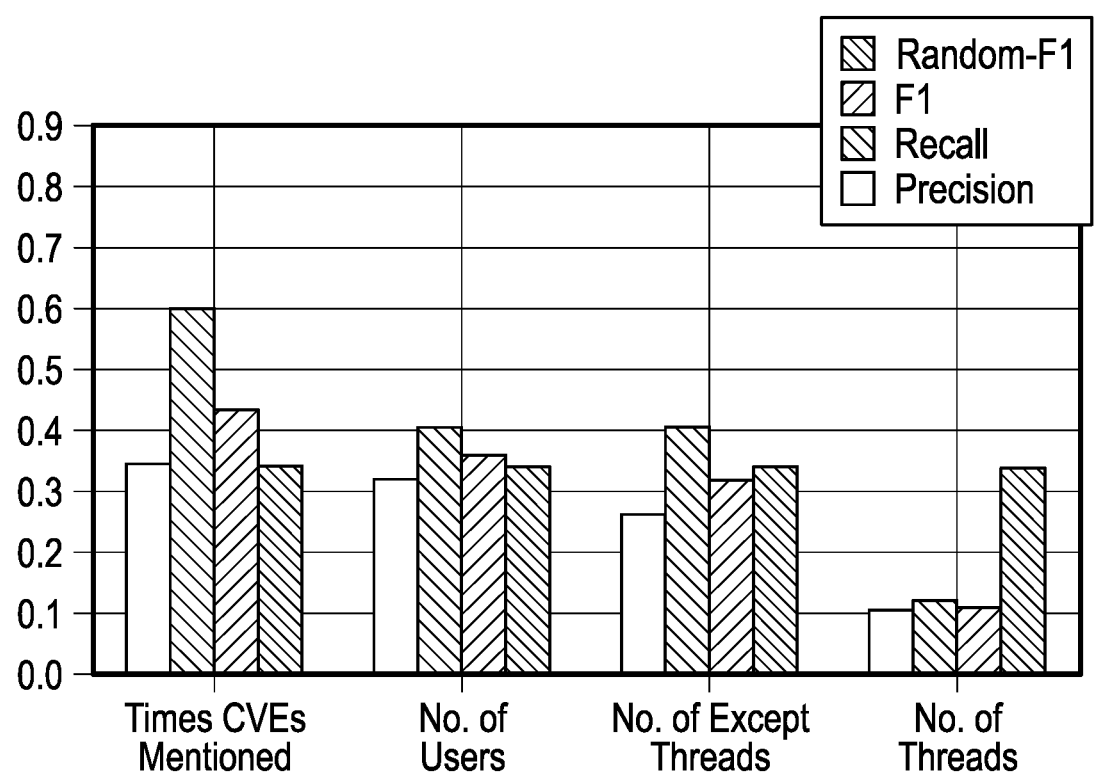
Figure 9:
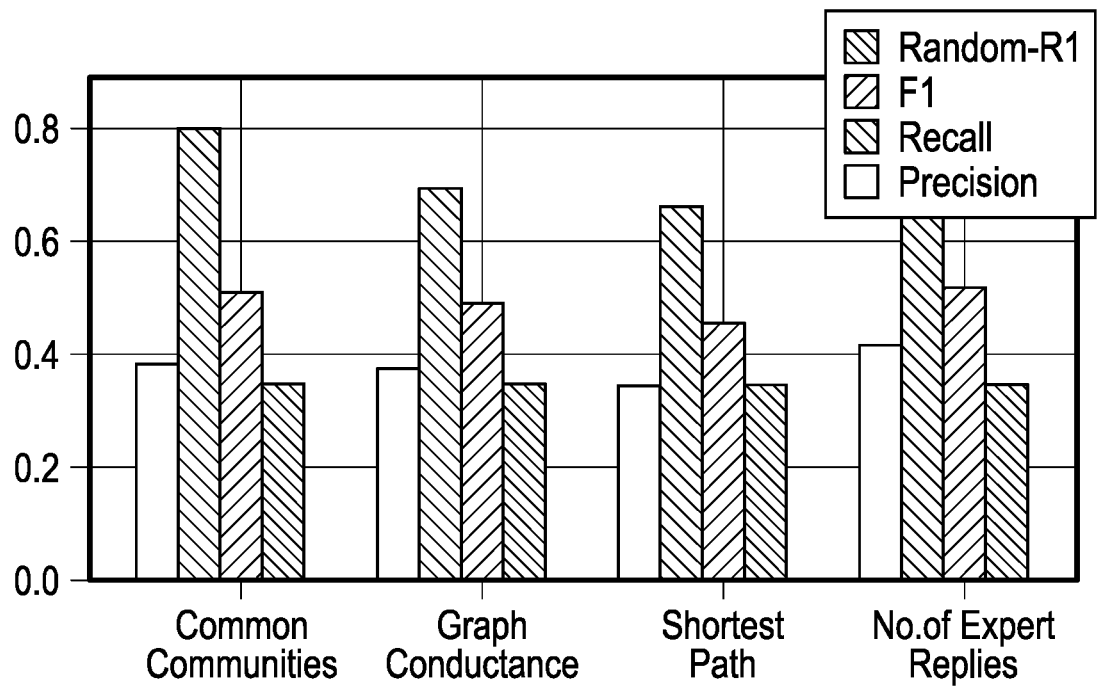
FIG. 9 is a graphical representation of classification results for a malicious-email attack dataset using SMOTE sampling on top of a supervised learning model.
Figure 9:
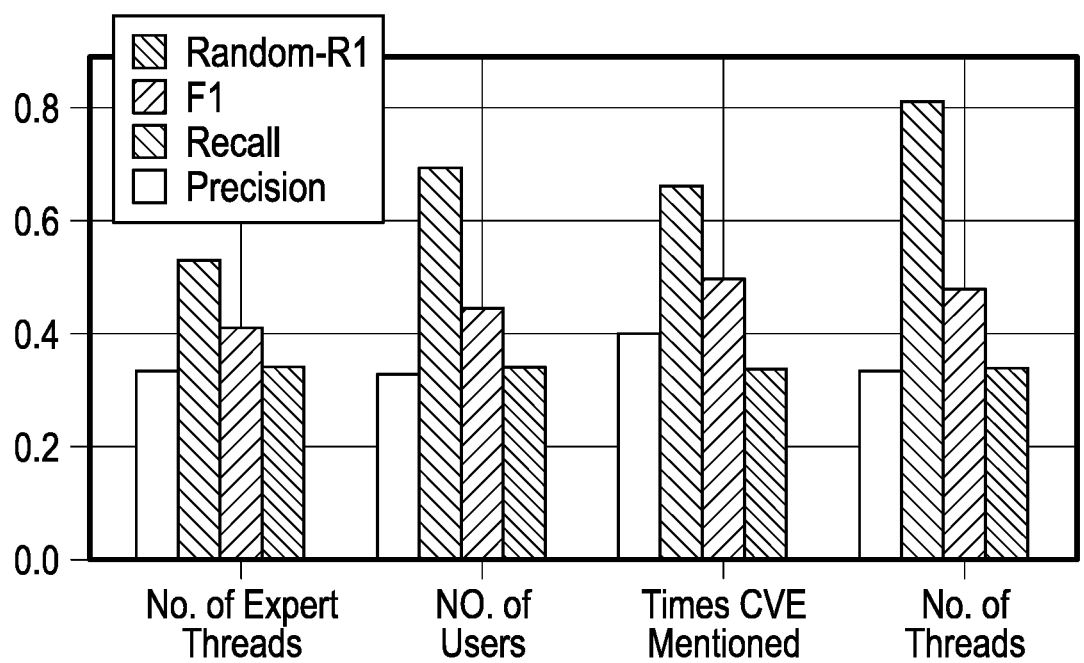

Additionally, SMOTE is used to deal with the class imbalance and the results for the malicious email attacks are plotted in FIG. 9 from the results and comparing them with those in FIG. 4B it is found that while for all features the recall increases, the precision drops substantially. It is also found that among the graph features, both graph conductance and the number of expert replies perform equally well with an F1 score of 0.52 while the number of threads with CVE mentions achieves the best results with an F1 score of 0.49.

Model with Feature Combinations

One of the major problems of the dataset is the imbalance in the training and test dataset. The added complexities arise from the fact that if all features are considered over the time window of feature selection, then the total number of features z (variables) for the learning models is: z=#features×($\eta$). In this scenario, this would typically be almost equal to the number of data points available for training depending on $\eta$ and also depending on whether different variations of the features in Table 2 are considered, which might result in overfitting. So in order to use all features in each group together for prediction, 3 additional regularization terms are used in the longitudinal regression model: the L1 penalty, the L2 penalty and the Group Lasso regularization. This framework of regularization is adapted to the set of features following previous studies on lasso for longitudinal data and the final objective function can be written as:

$$l(\beta) = -\sum_{i=1}^{N} \log\left(1 + e^{-y_i(\beta^T x_i)}\right) + \frac{m}{2}\|\beta\|_2^2 + l\|\beta\|_1 + g \cdot GL(\beta) \quad (4)$$

where m, l and g are the hyper-parameters for the regularization terms and the GL($\beta$) term is $\Sigma_{g=1}^{G}\|\beta_{I_g}\|_2$ here $I_g$ is the index set belonging to the $g^{th}$ group of variables, g=1 ... G. Here each g is the time index $t_n \in [t_{-n-\delta}, t_{-\delta}]$, so this group variable selection selects all features of one time in history while reducing some other time points to 0. It has the attractive property that it does variable selection at the temporal group level and is invariant under (group-wise) orthogonal transformations like ridge regression. It should be noted that while there are several other models that could be used for prediction that incorporates the temporal and sequential nature of the data like hidden markov models (HMM) and recurrent neural networks (RNN), the logit model allows us to transparently adjust to the sparsity of data, specially in the absence of a large dataset. For the model with the Group lasso regularization in Equation 4, the parameters m, l, g and 0.3, 0.3 and 0.1 are set based on a grid search on m an l and keeping g low so that most time points within a single feature is set to 0 for avoiding over fitting.

This model is cross validated on the 2 hyper-parameters: i and 6 and it was found that while the recall increases for all combinations of hyper-parameters for all features compared to results shown in FIG. 4B, the precision remains the same across different values of the hyper-parameters. The model is tested on different $\eta$ keeping fixed at 8 days and tested on different $\delta$ keeping $\eta$ fixed at 7 days. The best results are obtained predicting attacks for the malicious-email type using $\eta$=7 and $\delta$=8 days—a best F1 value of 0.56 (using eta=7 days and keeping delta fixed at 8) is obtained using this feature combination model against the best F1 score of 0.53 obtained from using single features without regularization.

As with most machine learning models and setups that attempt binary and multiclass classification including neural networks, the features attributed to the predictions can in most situations explain correlation—the causation needs more controlled studies like visualization by projecting features onto a lower dimensional space, ablation studies or understanding feature importance and using regularization techniques for ensuring sparsity for some features or eliminating redundancy. To this end, a goal is to investigate whether the framework with the signals from the darwkeb discussions correlate to real world events or to other types of attacks. 3 controlled studies are presented that show the extent to which the results of the framework are interpretable.

Prediction in High Activity Weeks

One of the main challenges in predicting external threats without any method to correlate them with external data sources like darkweb or any other database is that it is difficult to validate which kinds of attacks are most correlated with these data sources. To this end, a controlled experiment setup is examined for the malicious—email attacks in which only r the weeks which exhibited high frequency of attacks compared to the overall timeframe are considered: in this case weeks having more than 5 attacks in test time frame are considered. These high numbers may be due to multiple attacks in one or few specific days or few attacks on all days. The main idea is to see how well does the supervised model perform in these weeks of interest compared to the random predictions with and without prior distribution of attack information. The same supervised prediction method is run but evaluated only on these specific weeks.

Figure 14:
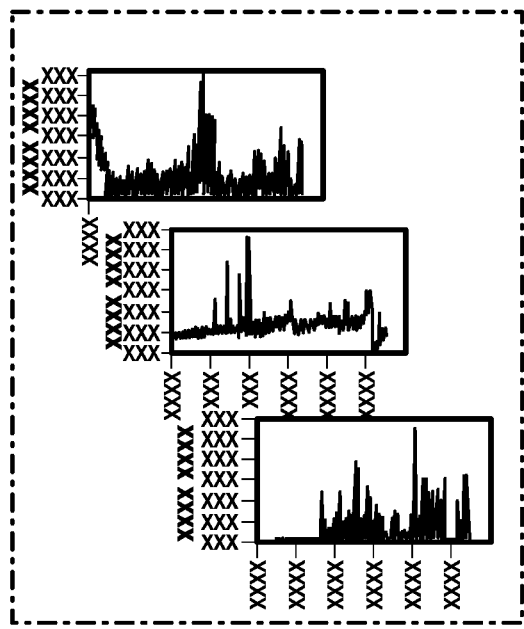
FIG. 14 is an illustration of a prediction task used in the present disclosure.
Figure 14:
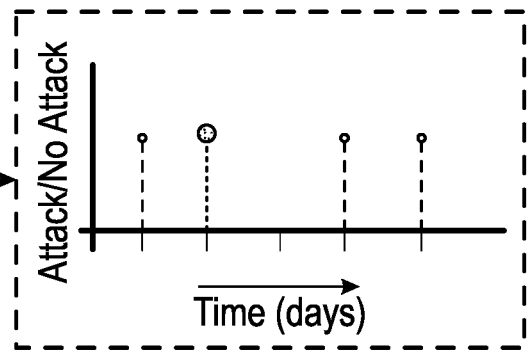

From the results shown in FIG. 14, it was found that the best results were shown by the common communities feature having a precision of 0.7 and a recall of 0.63 and an F1 score of 0.67 compared to the random (no priors) F1 score of 0.48 and a random (with priors) F1 score of 0.34 for the same time parameters. Among the statistics measures, a highest F1 score of 0.63 was obtained for the vulnerability mentions feature. Additionally, unlike the results over all the days, it was found that for these specific weeks, the model achieves high precision while maintaining comparable recall emphasizing the fact that the number of false positives are also reduced during these periods. This empirically suggests that for weeks that exhibit huge attacks, looking at Darwkeb sources for vulnerability mentions and the network structure analytics can definitely help predict cyber attacks.

Real World Attacks

In order to assess whether the features and the learning model are predictive of vulnerability exploitation based cyber attack incidents in the real world, one case of vulnerability exploitation that led to real world attacks and which had discussions on the darkweb associated with those vulnerabilities was manually collected. Since the main evaluations were reported on the malicious email incidents and as mentioned before, the malicious-email events are caused by malicious email attachments which when downloaded could cause a malicious script to run and execute its code thus intruding the host systems.

Figure 10:
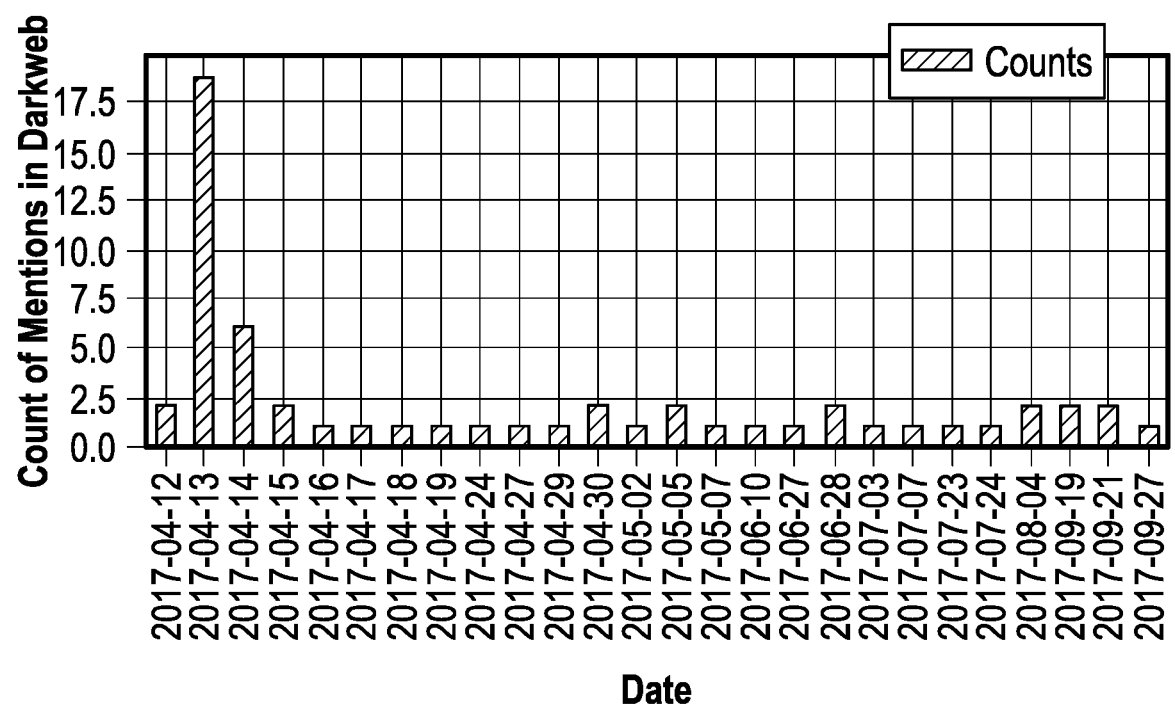
FIG. 10 is a graphical representation of a lifecycle of darkweb forum mentions.

CVE-2017-0199. This vulnerability is exploited through malicious Microsoft Office RTF documents that allow a malicious actor to download and execute a Visual Basic Script when the user opens the document containing the exploit. As reported in several documents, the document can be sent through an email or a link attachment and therefore is an example of malicious-email breach. This vulnerability has a CVS severity score of 7.8 which is considered high by NIST. There were reports of systems being exploited several months even following the patched date of this vulnerability. In this respect, this vulnerability captured a lot of attention due to the widespread damage that it created. The lifecycle of that vulnerability in the darkweb is shown in FIG. 10.

Figure 11A:
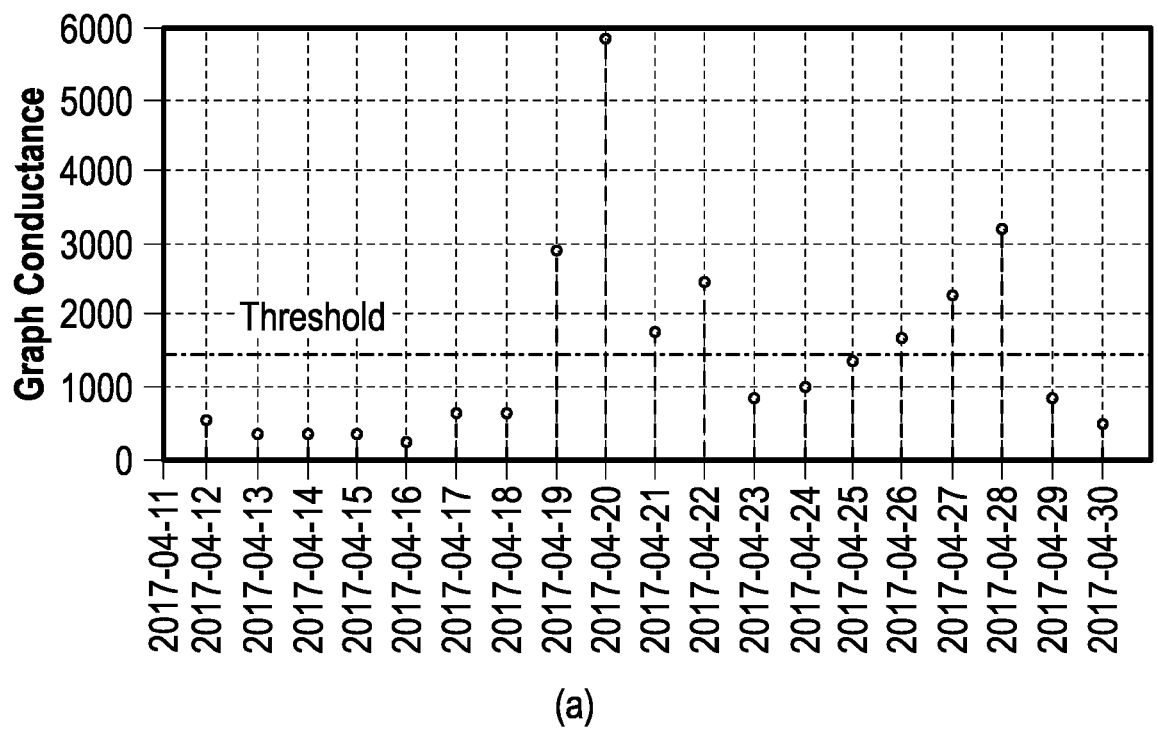
FIGS. 11A-11B are graphical representations of measures of graph conductance over a predetermined time period.
Figure 11B:
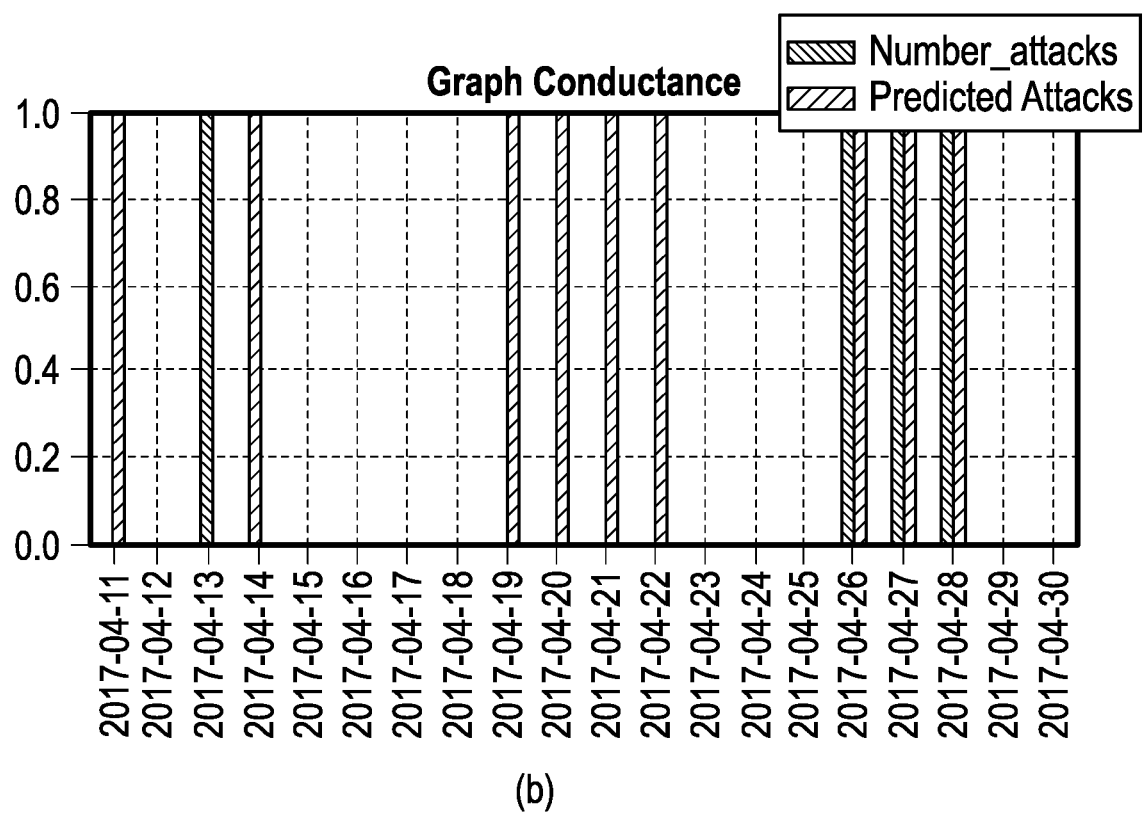

Although Microsoft released the patch on Apr. 11, 2017, discussions started as early as April 12 on the darkweb and there were 18 discussions mentioning the vulnerability on Apr. 13, 2017. When the content of the discussions on Apr. 13, 2017 was examined, it was found that most of the discussions surrounding users trying to execute the exploit—whether with malicious intentions or not is a research of sentiment analysis which is also conducted in this domain. When the attacks in the same and following weeks from Armstrong's malicious email incidents dataset were looked at, it was found that the first attack occurred on Apr. 13, 2018 and in the following week there were attacks on 3 consecutive days April, 26, 27 and 28 as shown in FIG. 11B The period contained a total of 5 days of reported malicious-email incidents in the span of 20 days considered.

$\eta=7$ days and $\tau=8$ days are used for the features (the same parameters used in the previous experiments) and $\zeta=7$ is set, that is a day t is flagged as an anomaly if $\mathcal{N}(t) \geq 1$, or in other words if there is at least one anomaly flagged in the time period $[t_{-n-\delta}, t_{-\delta}]$ or setting the thresholds that captures whether a particular day has an anomaly in terms of the feature values, the threshold is kept to the mean of the feature values obtained from the training dataset for the respective features. The feature Graph Conductance is shown for the weeks in FIG. 11A, the red line denoting the mean of the training data. Any day t is flagged as having an anomaly if the graph conductance on that day crosses the red line. This setup was able to predict the attacks on days April 26, 27 and 28 successfully while missing the attacks on April 13 and April 14. This led to a precision of 0.26 and recall of 0.6 and an F1 score of 0.46 in those 20 days. Two important observations are made: first it is clear that the predicted attacks on the 3 days were due to the anomalies raised in the previous 2 weeks as shown in FIG. 11B and secondly, although the CVE mentions shown in FIG. 10 does not show any spikes on April 19, 20, 21, 22 and the feature anticipated some anomaly on those days which caused the alerts in the following weeks.

Experiments with Another Security Breach Dataset

Figure 12A:
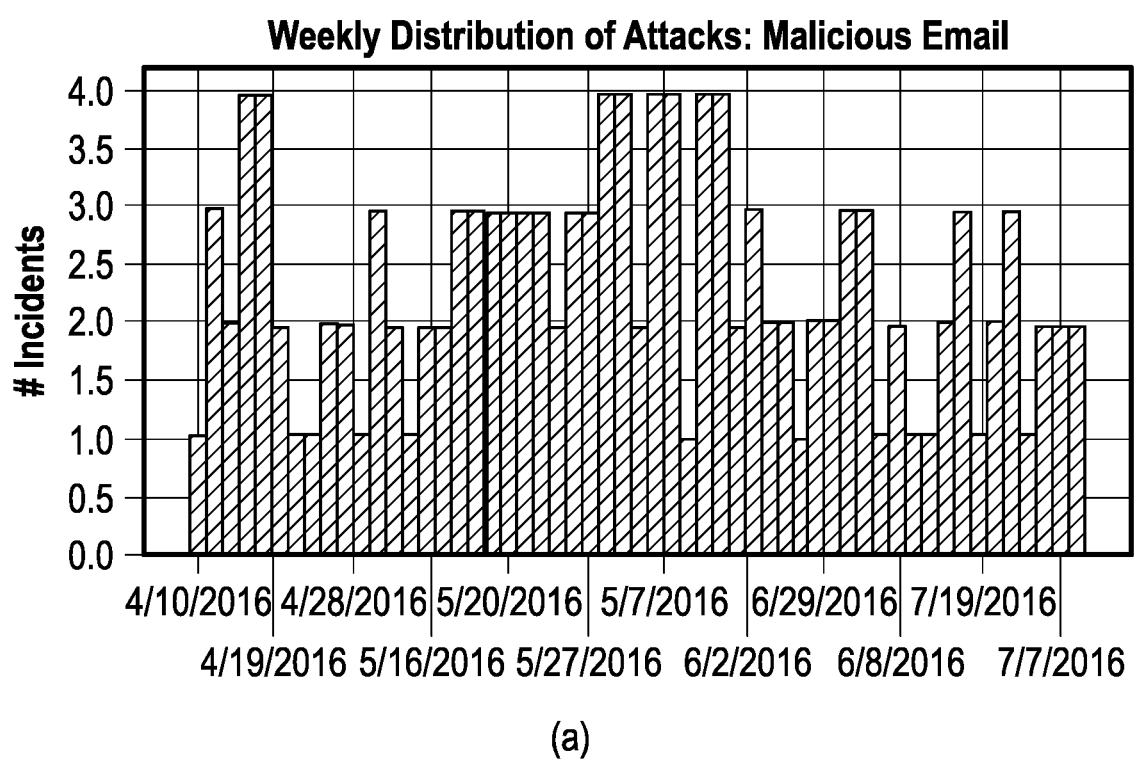
FIGS. 12A-12C are graphical representations of weekly occurrences of security breach incidents.
Figure 12B:
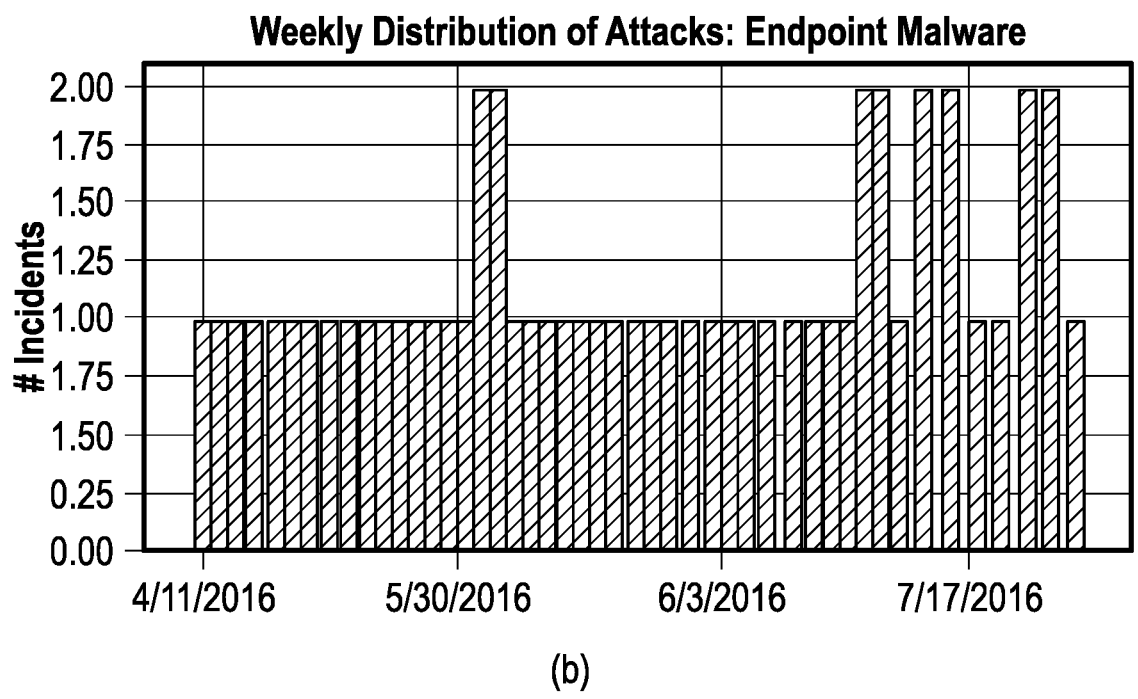
Figure 12C:
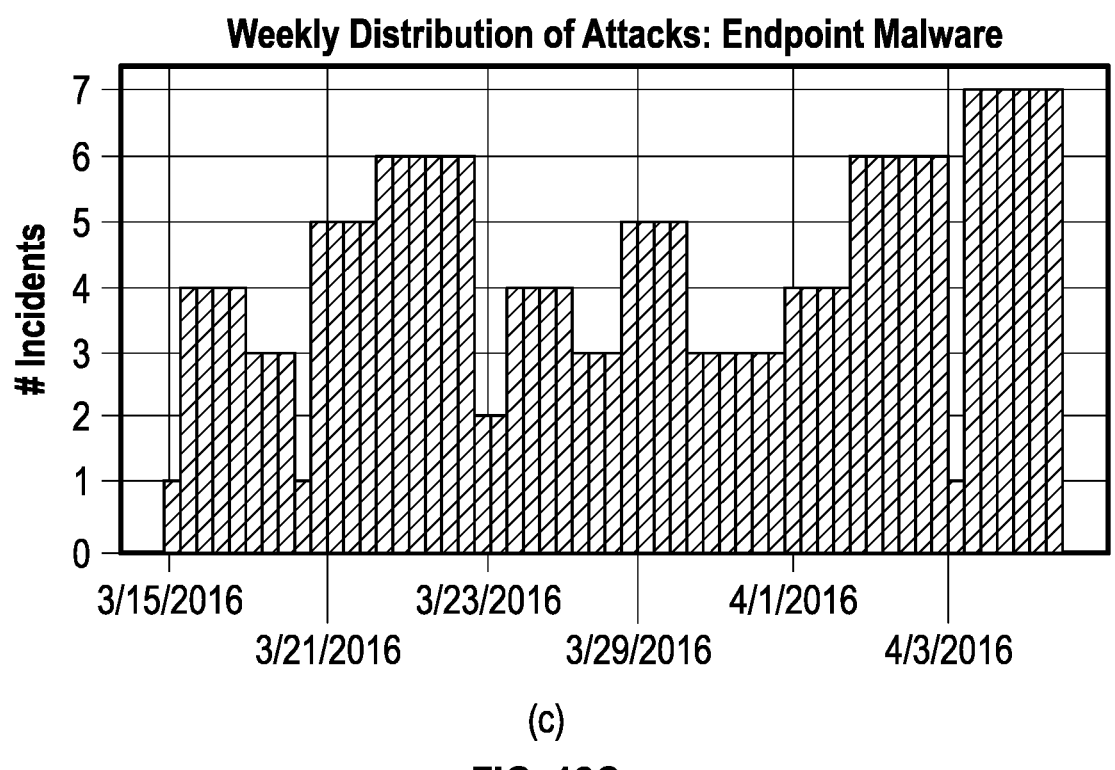
Figure 13A:
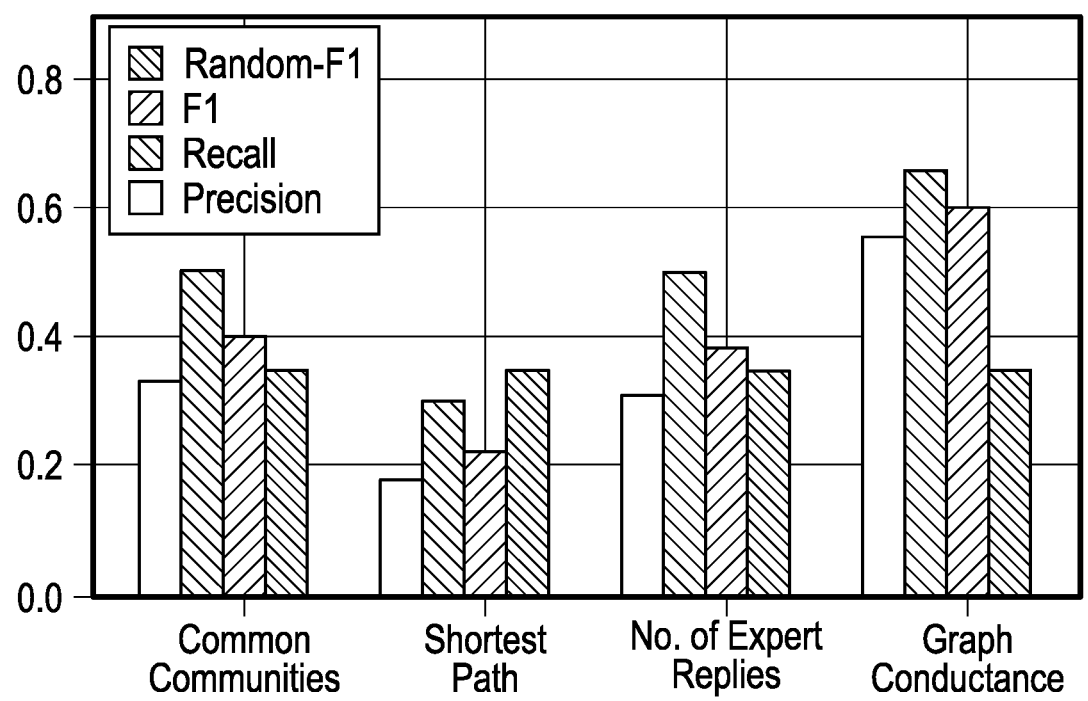
FIGS. 13A-13D are graphical representations of classification results on Dexter events for features considering a supervised model.
Figure 13B:
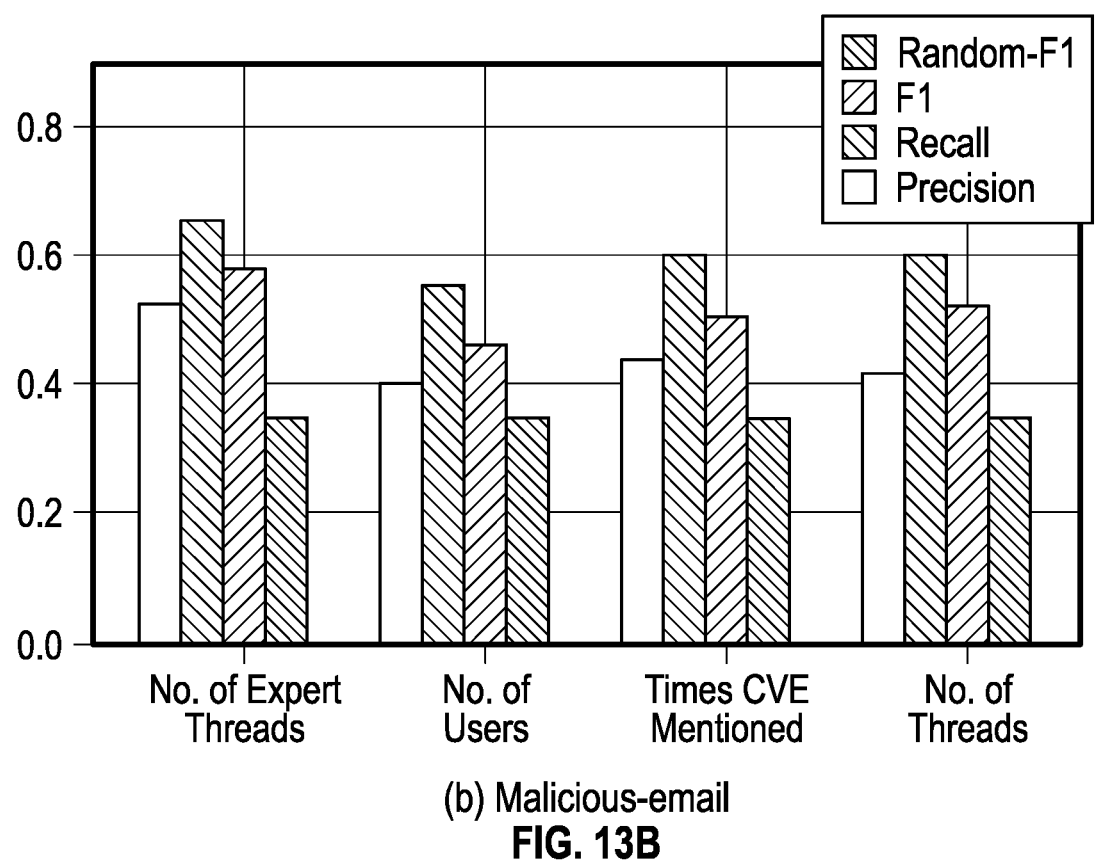
Figure 13C:
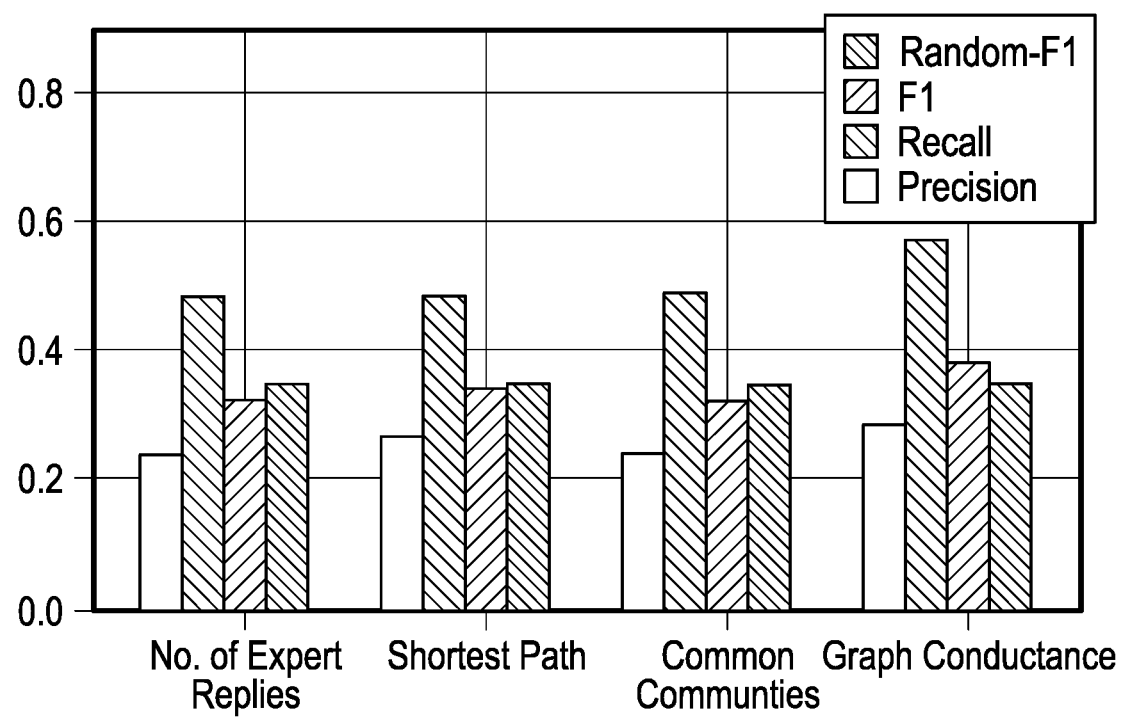
Figure 13D:
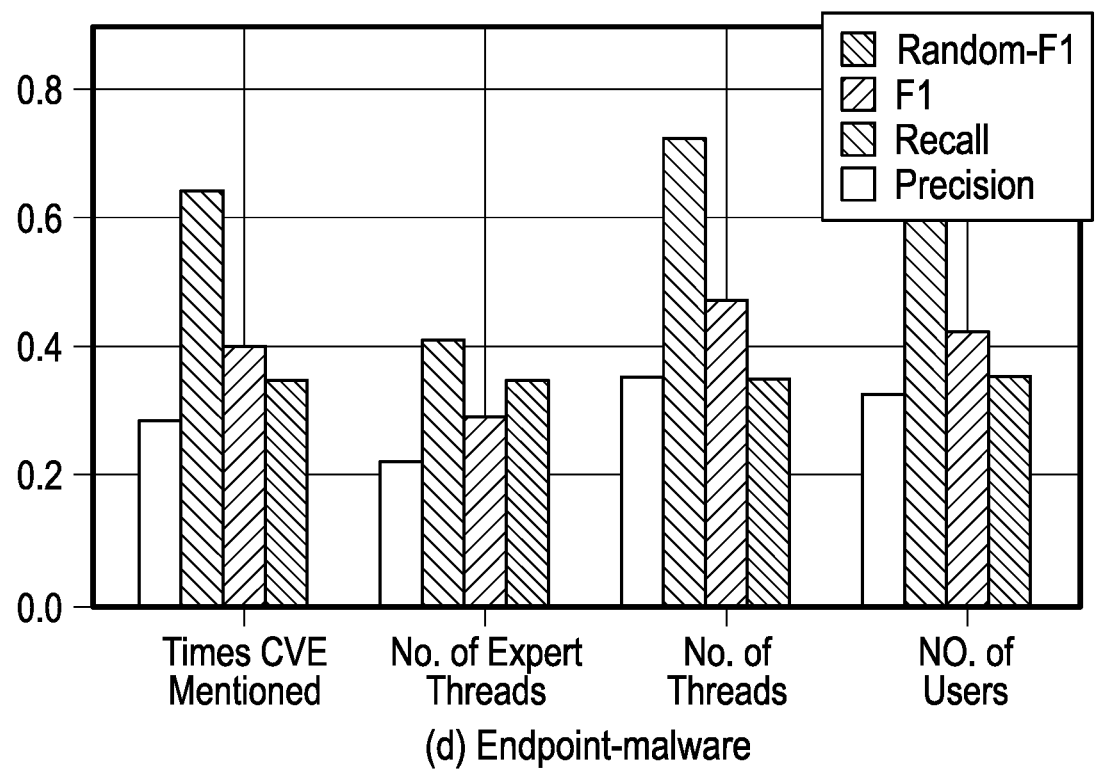

One of the reasons behind using Armstrong dataset as the ground truth data is the length of the time frame over which the attack data was available—not just the number of attack cases reported (one could have a lot of attack cases reported for only a few days). Since a binary classification problem is being attempted, the more spread the attacks are, the more training point the models have and the more test points for evaluation. However, as a complementary experiment on the learnability of the model parameters specific to companies, the prediction problem is tested on a dataset of security incidents from another company named Dexter. As shown in FIG. 1, the distribution of attacks over time is different for the events. Compared to the Armstring dataset, the time span for which the attack ground truth data is available is much shorter—around 5 months of attack data was obtained for the 3 events shown in FIGS. 12A-12C, starting from April 2016 to August 2016. 58 distinct days with at least one incident tagged as malicious-destination, 35 distinct days tagged as endpoint-malware and 114 distinct days for malicious-email events are observed. A total of 565 incidents (not distinct days) over a span of 5 months were considered in the study which is twice the number reported for Armstrong. However, compared to the data spread over 17 months obtained from Armstrong, only 4 months were spent to train and test using Dexter data.

The same attack prediction framework is used for predicting the attacks on Dexter, the results of which are shown in FIGS. 13A-13D—the best F1 score of 0.6 is obtained on the malicious email attacks using the graph conductance measure and an F1 score of 0.59 using the expert threads statistics forum metadata feature (refer to Table 2) against a random F1 score of 0.37 is obtained. This suggests that the network features which on how experts reply to posts from regular users can be useful in obtaining improved results over other features which do not consider this reply path structure.

Computing System

Figure 15:
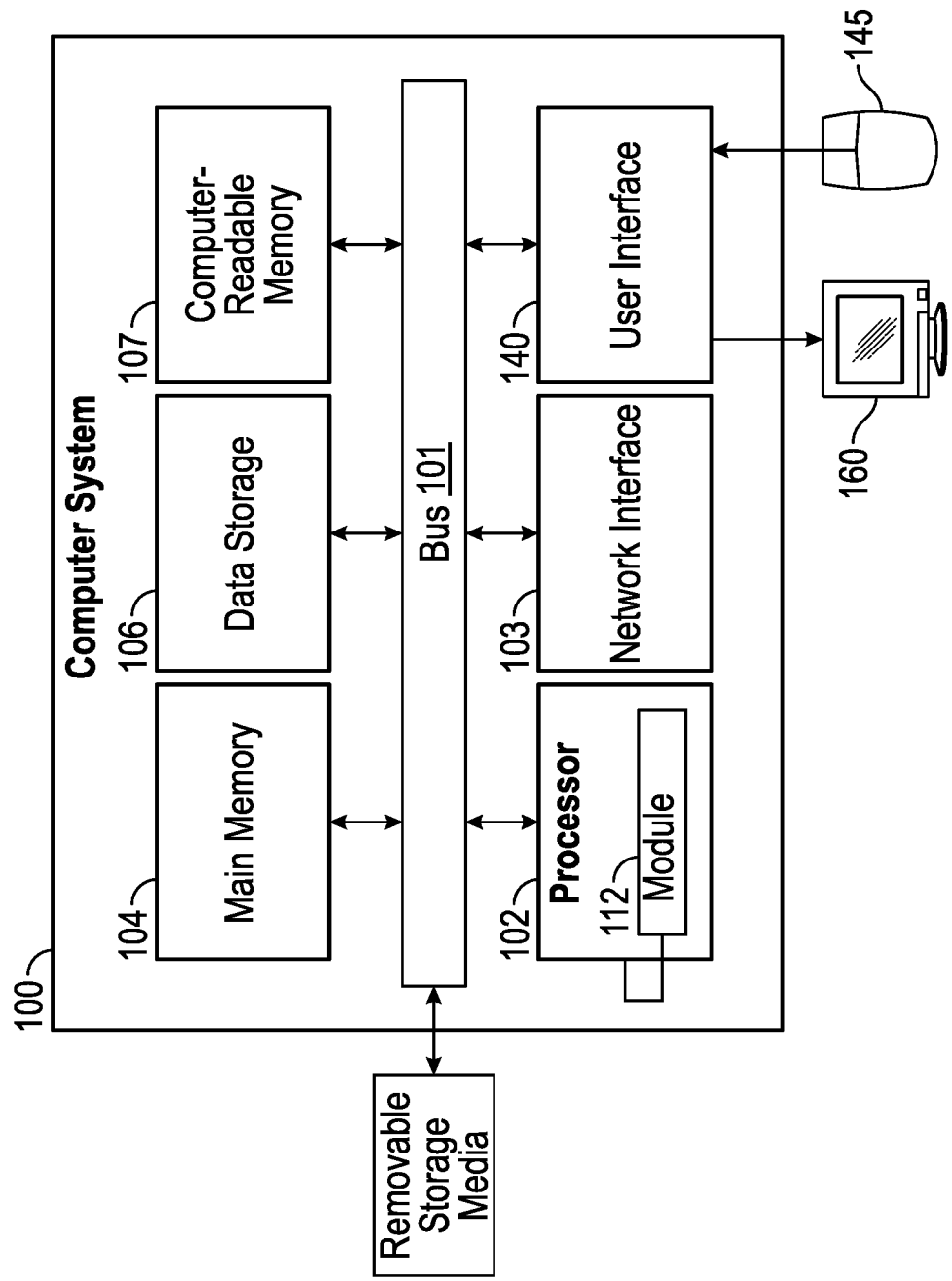
FIG. 15 is an example schematic diagram of a computing device that may implement various methodologies for predicting enterprise cyber incidents using social network analysis as described herein.

FIG. 15 illustrates an example of a suitable computing system 100 used to implement various aspects of the present system and methods for predicting enterprise cyber incidents using social network analysis. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules 112. Such modules 112 are hardware-implemented, and thus include at least one tangible unit capable of performing certain operations and may be configured or arranged in a certain manner. For example, a hardware-implemented module 112 may comprise dedicated circuitry that is permanently configured (e.g., as a special-purpose processor, such as a field-programmable gate array (FPGA) or an application-specific integrated circuit (ASIC)) to perform certain operations. A hardware-implemented module 112 may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module 112 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 112 are temporarily configured (e.g., programmed), each of the hardware-implemented modules 112 need not be configured or instantiated at any one instance in time. For example, where the hardware-implemented modules 112 comprise a general-purpose processor configured using software, the general-purpose processor may be configured as respective different hardware-implemented modules 112 at different times. Software may accordingly configure a processor 102, for example, to constitute a particular hardware-implemented module at one instance of time and to constitute a different hardware-implemented module 112 at a different instance of time.

Hardware-implemented modules 112 may provide information to, and/or receive information from, other hardware-implemented modules 112. Accordingly, the described hardware-implemented modules 112 may be regarded as being communicatively coupled. Where multiple of such hardware-implemented modules 112 exist contemporaneously, communications may be achieved through signal transmission (e.g., over appropriate circuits and buses) that connect the hardware-implemented modules. In embodiments in which multiple hardware-implemented modules 112 are configured or instantiated at different times, communications between such hardware-implemented modules may be achieved, for example, through the storage and retrieval of information in memory structures to which the multiple hardware-implemented modules 112 have access. For example, one hardware-implemented module 112 may perform an operation, and may store the output of that operation in a memory device to which it is communicatively coupled. A further hardware-implemented module 112 may then, at a later time, access the memory device to retrieve and process the stored output. Hardware-implemented modules 112 may also initiate communications with input or output devices.

As illustrated, the computing system 100 may be a general purpose computing device, although it is contemplated that the computing system 100 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device may include various hardware components, such as a processor 102, a main memory 104 (e.g., a system memory), and a system bus 101 that couples various system components of the general purpose computing device to the processor 102. The system bus 101 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing system 100 may further include a variety of computer-readable media 107 that includes removable/non-removable media and volatile/nonvolatile media, but excludes transitory propagated signals. Computer-readable media 107 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 104 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 102. For example, in one embodiment, data storage 106 holds an operating system, application programs, and other program modules and program data.

Data storage 106 may also include other removable/non-removable, volatile/nonvolatile computer storage media. For example, data storage 106 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 100.

A user may enter commands and information through a user interface 140 or other input devices 145 such as a tablet, electronic digitizer, a microphone, keyboard, and/or pointing device, commonly referred to as mouse, trackball or touch pad. Other input devices 145 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 145 are often connected to the processor 102 through a user interface 140 that is coupled to the system bus 101, but may be connected by other interface and bus structures, such as a parallel port, game port or a universal serial bus (USB). A monitor 160 or other type of display device is also connected to the system bus 101 via user interface 140, such as a video interface. The monitor 160 may also be integrated with a touch-screen panel or the like.

The general purpose computing device may operate in a networked or cloud-computing environment using logical connections of a network interface 103 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device may be connected to a public and/or private network through the network interface 103. In such embodiments, a modem or other means for establishing communications over the network is connected to the system bus 101 via the network interface 103 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method of threat prediction based on social network features computed on a streaming basis, comprising:
    generating, by a processor, a plurality of evolving networks including a historical network defining a first temporal graph corresponding to a first set of forum posts aggregated within a predetermined time period, and a daily network defining a second temporal graph corresponding to a second set of forum posts for a current day;
    generating, by the processor, an auxiliary graph that incorporates historical information from the plurality of evolving networks by merging the first temporal graph with the second temporal graph; and
    computing by the processor a set of features for the current day from the auxiliary graph based on community information about known expert users associated with the first temporal graph.

2. The method of claim 1, further comprising computing the set of features, by:
    inputting a set of predetermined experts and a set of tuples associated with the set of predetermined experts;
    outputting a number of non-experts at a certain time that share communities with the set of predetermined experts;
    extracting a plurality of communities from the plurality of evolving networks;
    defining a community associated with the set of predetermined experts;
    computing, for each of the set of experts, all associated communities;
    defining a set of individuals who have posted in a timeframe based on the auxiliary network;
    defining a set of tuples associated with the timeframe;
    iterating through each of the set of individuals who posted during the time frame to assess a measure of common communities.

3. The method of claim 2, wherein each of the set of individuals are connected using heuristics through one of either a temporal constraint or a spatial constraint.

4. The method of claim 2, wherein the set of predetermined experts is extracted from the historical network while excluding the daily network.

5. The method of claim 2, wherein the set of predetermined experts is extracted from the historical network following constraints comprising:
    extracting each of the set of predetermined users who have mentioned a common vulnerability and exposure in a post in a time spanned by the historical network;
    extracting each of the set of predetermined users who have mentioned a common vulnerability and exposure in a post belonging to a number of top common platform enumerations for a time spanned by the historical network; and
    extracting each of the set of predetermined users who have an indegree in the historical network greater than a predetermined threshold.

6. The method of claim 1, wherein the evolving networks include a reply network corresponding to a thread within a forum.

7. The method of claim 1, wherein the set of features comprise a measure of graph conductance, a measure of shortest path, a set of expert replies, and the measure of common communities.

8. The method of claim 1, further comprising employing, by the processor, an unsupervised machine learning model configured to:
    aggregate a time series associated with the historical network;
    separate a set of daily feature vectors into normal and anomalous components;
    compute a squared prediction error from the anomalous components; and
    flag points within the set of daily feature vectors as anomalous using a threshold based measure, the threshold based measure denoting a limit for anomaly among a set of values chosen for flagging a point for the set of daily feature vectors.

9. The method of claim 1, wherein the historical network is constant for all days in a particular month.

10. The method of claim 1, wherein the daily network is recreated on a daily basis.

* * * * *